United States Patent
Bash et al.

(10) Patent No.: US 7,251,547 B2
(45) Date of Patent: *Jul. 31, 2007

(54) CORRELATION OF VENT TILE SETTINGS AND RACK TEMPERATURES

(75) Inventors: Cullen E. Bash, San Francisco, CA (US); Chandrakant D. Patel, Fremont, CA (US); Ratnesh K. Sharma, Union City, CA (US); Abdlmonem Beitelmal, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 293 days.

This patent is subject to a terminal disclaimer.

(21) Appl. No.: 10/960,574

(22) Filed: Oct. 8, 2004

(65) Prior Publication Data
US 2006/0080001 A1    Apr. 13, 2006

(51) Int. Cl.
*G05B 15/00* (2006.01)
*F25D 17/00* (2006.01)
*F25D 17/04* (2006.01)

(52) U.S. Cl. .................. 700/276; 62/186; 62/259.2
(58) Field of Classification Search ............. 700/276; 236/49.3; 62/186, 259.2; 361/695
See application file for complete search history.

(56) References Cited

U.S. PATENT DOCUMENTS

| | | | |
|---|---|---|---|
| 6,374,627 B1 * | 4/2002 | Schumacher et al. | 62/259.2 |
| 6,574,104 B2 * | 6/2003 | Patel et al. | 361/695 |
| 6,868,682 B2 * | 3/2005 | Sharma et al. | 62/180 |
| 6,925,828 B1 * | 8/2005 | Gerstner et al. | 62/259.2 |
| 7,013,968 B2 * | 3/2006 | Beitelmal et al. | 165/244 |
| 2003/0067745 A1 * | 4/2003 | Patel et al. | 361/690 |
| 2005/0182523 A1 * | 8/2005 | Nair | 700/276 |
| 2006/0075764 A1 * | 4/2006 | Bash et al. | 62/178 |
| 2006/0091229 A1 * | 5/2006 | Bash et al. | 236/49.3 |

* cited by examiner

*Primary Examiner*—Leo Picard
*Assistant Examiner*—Steven R. Garland
(74) *Attorney, Agent, or Firm*—Richard P. Lange

(57) ABSTRACT

In a method for correlating vent tiles with racks based upon vent tile settings and rack inlet temperatures, the vent tiles are set to a first setting, the first vent tile settings are recorded and the temperatures at the inlets of the racks are detected at the first vent tile settings. One of the vent tiles is closed to obtain a second setting, the second vent tile settings are recorded and the temperatures at the inlets of the racks are detected at the second vent tile settings. In addition, the vent tiles and the racks are correlated based upon the settings of the vent tiles and the temperatures detected at the first vent tile settings and the second vent tile settings.

32 Claims, 9 Drawing Sheets

CORRELATION OF VENT TILE SETTINGS AND RACK TEMPERATURES

CROSS-REFERENCE TO RELATED APPLICATION

This application is related to commonly assigned and co-pending U.S. patent application Ser. No. 10/960,573, entitled "Correlation of Vent Tiles and Racks", filed on even date herewith, the disclosure of which is hereby incorporated by reference in its entirety.

BACKGROUND

A data center may be defined as a location, for instance, a room that houses computer systems arranged in a number of racks. A standard rack, for instance, an electronics cabinet, is defined as an Electronics Industry Association (EIA) enclosure, 78 in. (2 meters) wide, 24 in. (0.61 meter) wide and 30 in. (0.76 meter) deep. These racks are configured to house a number of computer systems, about forty (40) systems, with future configurations of racks being designed to accommodate 200 or more systems. The computer systems typically dissipate relatively significant amounts of heat during the operation of the respective components. For example, a typical computer system comprising multiple microprocessors may dissipate approximately 250 W of power. Thus, a rack containing forty (40) computer systems of this type may dissipate approximately 10 KW of power.

Data centers are typically equipped with a raised floor with vent tiles configured to provide cool air to the computer systems from a pressurized plenum in the space below the raised floor. In certain instances, these vent tiles contain manually adjustable dampers for varying the flow rate of cool air there through. However, because these vent tiles cannot be remotely controlled, they are typically unable to vary the airflow to dynamically provision the data center with cooling resources. In addition, these vent tiles are typically manually actuated without knowledge of how each vent tile affects computer systems in its proximity. These actuations frequently have unintended consequences, such as, inadequate airflow delivery to the racks, adverse re-circulation of heated and cooled airflows, and wasted energy consumption. This may lead to inefficiencies in both cooling of the computer systems as well as in the operations of air conditioning units.

In other instances, automated vent tiles have been used in data centers to generally enable remote actuation of the vent tiles via feedback control algorithms. Conventional automated vent tiles are typically operated, however, without substantially accurate knowledge of how actuations of these vent tiles affect airflow in the data center. A process for associating vent tiles with racks would therefore be desirable.

SUMMARY OF THE INVENTION

According to an embodiment, the present invention pertains to a method for correlating vent tiles with racks based upon vent tile settings and rack inlet temperatures. In the method, the vent tiles are set to a first setting, the first vent tile settings are recorded and the temperatures at the inlets of the racks are detected at the first vent tile settings. One of the vent tiles is closed to obtain a second setting, the second vent tile settings are recorded and the temperatures at the inlets of the racks are detected at the second vent tile settings. In addition, the vent tiles and the racks are correlated based upon the settings of the vent tiles and the temperatures detected at the first vent tile settings and the second vent tile settings.

BRIEF DESCRIPTION OF THE DRAWINGS

Features of the present invention will become apparent to those skilled in the art from the following description with reference to the figures, in which.

DETAILED DESCRIPTION OF THE INVENTION

Figure 1A:
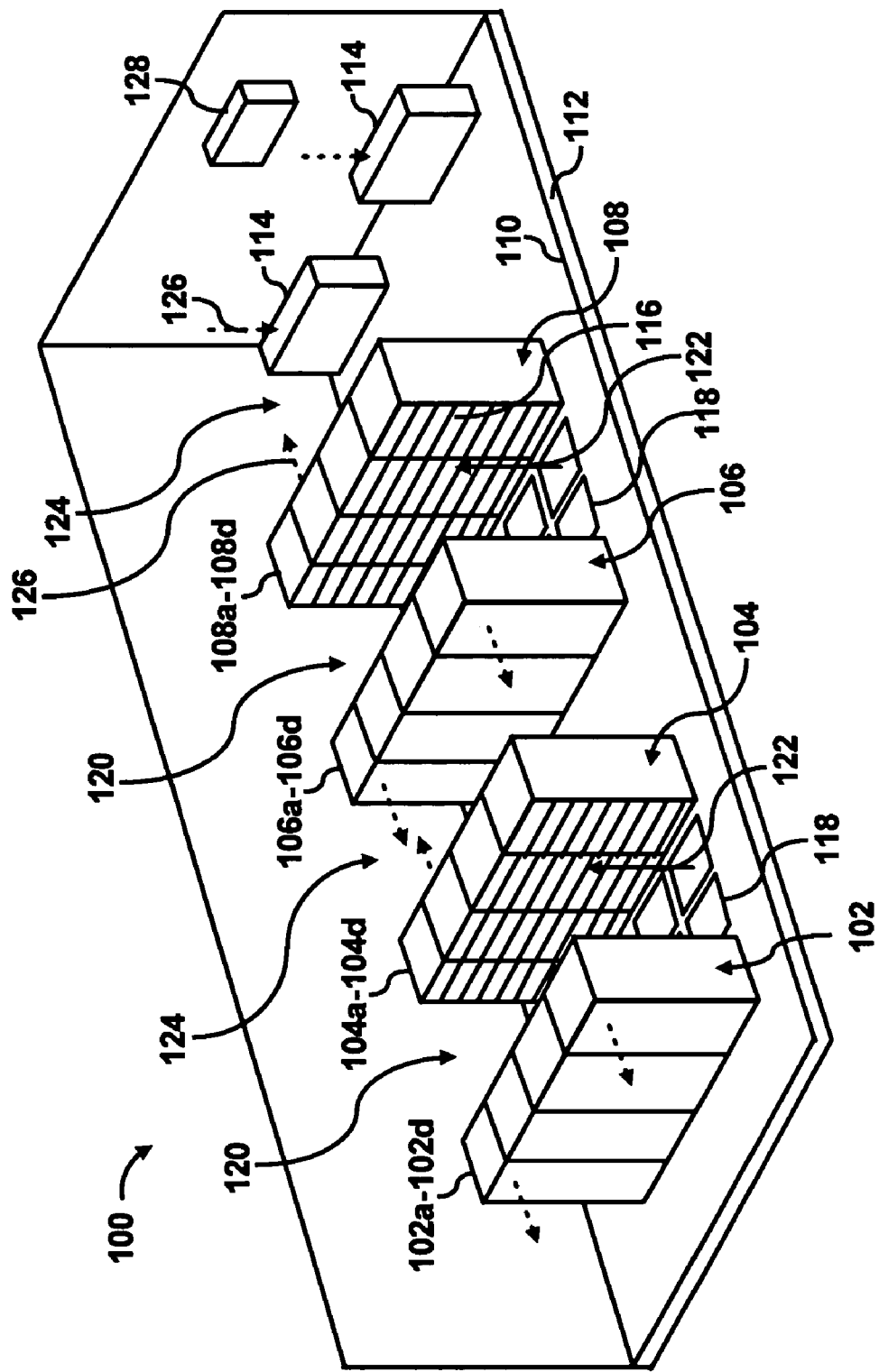
FIG. 1A shows a simplified perspective view of a data center according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

According to various examples, vent tiles in a data center are commissioned to enable determinations of their relationships with various racks of equipment housed in the data center. More particularly, procedures and algorithms are described herein for evaluating the relationships between the vent tiles and the racks. These relationships may be described by an index that relates the inlet temperatures of airflow delivered into the racks to the degree or percentage that the vent tiles are open. In certain instances, the effects of airflow re-circulation may also be included in the determination of the index. This index has been termed the "Vent Tile Opening Index" or VTO, for simplicity of description purposes.

The VTO may be employed for the development of vent tile control algorithms configured to, for instance, enable relatively efficient and dynamic provisioning of cooling resources in a data center. In addition, establishment of the relationships between the vent tiles and the racks may enable the creation of the vent tile control algorithms. In order to maintain certain levels of efficiency, vent tile control algorithms, in general, are required to compensate for the variations of the relationships between vent tiles and racks. The relationships may vary due to, for instance, movement, changing, or manipulation of the equipment, changes in airflow patterns, pressure distributions, etc. In addition, the relationships may vary as computer room air condition (CRAC) unit flow rates change relative to each other in a multi-CRAC unit data center, obstructions are added or removed from within the floor plenum, the pressure distribution within the floor plenum changes, etc. In this regard, the VTO disclosed herein may compensate for the varying relationships such that the vent tile control algorithms may also adapt as the data center environment changes.

Through a determination of VTO, the relationships between various racks and vent tiles may be established. Thus, for instance, the correlation between particular racks and vent tiles may be used to determine how airflow through one or more vent tiles should be varied to obtain desired airflow characteristics through the particular racks. In this regard, vent tile control algorithms may use these relationships in controlling vent tiles to achieve desired cooling results in the data center.

Although particular reference is made throughout the present disclosure to air conditioning units and vent tiles in data centers for cooling racks, it should be understood that certain principles presented herein may be applied to cooling systems in other types of buildings. For instance, correlations between ceiling mounted air supply vent tiles and various areas of a room containing temperature sensors may be made using VTO. In this example, VTO may be used to develop control algorithms that operate the air supply vent tiles to ensure that the various areas of the room receive desired supply airflow temperatures. Thus, the descriptions presented herein with respect to VTO should not be construed as being limited solely to data centers, but that the data center environment is an example of a suitable application of the principles presented herein.

With reference first to FIG. 1A, there is shown a simplified perspective view of a data center 100 which may employ various examples of the invention. The terms "data center" are generally meant to denote a room or other space where one or more components capable of generating heat may be situated. In this respect, the terms "data center" are not meant to limit the invention to any specific type of room where data is communicated or processed, nor should it be construed that use of the terms "data center" limits the invention in any respect other than its definition herein above.

It should be readily apparent that the data center 100 depicted in FIG. 1A represents a generalized illustration and that other components may be added or existing components may be removed or modified without departing from the scope of the invention. For example, the data center 100 may include any number of racks and various other components. In addition, it should also be understood that heat generating/dissipating components may be located in the data center 100 without being housed in racks.

The data center 100 is depicted as having a plurality of racks 102-108, for instance, electronics cabinets, aligned in parallel rows. Each of the rows of racks 102-108 is shown as containing four racks (a-d) positioned on a raised floor 110. A plurality of wires and communication lines (not shown) may be located in a space 112 beneath the raised floor 110. The space 112 may also function as a plenum for delivery of cooled air from one or more computer room air conditioning (CRAC) units 114 to the racks 102-108. The cooled air may be delivered from the space 112 to the racks 102-108 through vent tiles 118 located between some or all of the racks 102-108. The vent tiles 118 are shown as being located between racks 102 and 104 and 106 and 108.

As previously described, the CRAC units 114 generally operate to supply cooled air into the space 112. The cooled air contained in the space 112 may include cooled air supplied by one or more CRAC units 114. Thus, characteristics of the cooled air, such as, temperature, pressure, flow rate, etc., may substantially be affected by one or more of the CRAC units 114. By way of example, the cooled air supplied by one CRAC unit 114 may mix with cooled air supplied by another CRAC unit 114. In this regard, characteristics of the cooled air at various areas in the space 112 and the cooled air supplied to the racks 102-108 may vary, for instance, if the temperatures or the volume flow rates of the cooled air supplied by these CRAC units 114 differ due to mixing of the cooled air. In certain instances, the level of influence of a CRAC unit 114 over the racks 102-108 may be higher for those racks 102-108 that are in closer proximity to the CRAC unit 114. In addition, the level of influence of a CRAC unit 114 over the racks 102-108 may be lower for those racks 102-108 that are located farther away from the CRAC unit 114.

Moreover, a particular vent tile 118 may have greater levels of influence over particular racks 102-108 and have lesser levels of influence over other racks 102-108. The level of influence the vent tiles 118 have over various racks 102-108 is considered herein as a vent tile opening index (VTO) and is described in greater detail herein below. In one respect, the VTO may be employed in vent tile control algorithms to relatively accurately control the level of cooled airflow delivered to the various racks 102-108.

The vent tiles 118 may comprise manually or remotely adjustable vent tiles. In this regard, the vent tiles 118 may be manipulated to vary, for instance, the mass flow rates of cooled air supplied to the racks 102-108. In addition, the vent tiles 118 may comprise the dynamically controllable vent tiles disclosed and described in commonly assigned U.S. Pat. No. 6,574,104, the disclosure of which is hereby incorporated by reference in its entirety. As described in the 6,574,104 patent, the vent tiles 118 are termed "dynamically controllable" because they generally operate to control at least one of velocity, volume flow rate and direction of the cooled airflow there through. In addition, specific examples of dynamically controllable vent tiles 118 may be found in U.S. Pat. No. 6,694,759, filed on Jan. 27, 2003, which is assigned to the assignee of the present invention and is incorporated by reference herein in its entirety.

The racks 102-108 are generally configured to house a plurality of components 116 capable of generating/dissipating heat (not shown), for instance, processors, micro-controllers, high-speed video cards, memories, semi-conductor devices, and the like. The components 116 may be elements of a plurality of subsystems (not shown), for instance, computers, servers, bladed servers, etc. The subsystems and the components may be operated to perform various electronic functions, for instance, computing, switching, routing, displaying, and the like. In the performance of these electronic functions, the components, and therefore the subsystems, may generally dissipate relatively large amounts of heat. Because the racks 102-108 have generally been known to include upwards of forty (40) or more subsystems, they may transfer substantially large amounts of heat to the cooled air flowing there through to maintain the subsystems and the components generally within predetermined operating temperature ranges.

The areas between the racks 102 and 104 and between the racks 106 and 108 may comprise cool aisles 120. These aisles are considered "cool aisles" because they are configured to receive cooled airflow from the vent tiles 118, as generally indicated by the arrows 122. In addition, the racks 102-108 generally receive cooled air from the cool aisles 120. The aisles between the racks 104 and 106, and on the rear sides of racks 102 and 108, are considered hot aisles 124. These aisles are considered "hot aisles" because they are positioned to receive air that has been heated by the components 116 in the racks 102-108, as indicated by the arrows 126. By substantially separating the cool aisles 120 and the hot aisles 124, for instance, with the racks 102-108, the heated air may substantially be prevented from re-circulating with the cooled air prior to delivery into the racks 102-108. In addition, the cooled air may also substantially be prevented from re-circulating with the heated air prior to returning to the CRAC units 114. However, there may be areas in the data center 100 where re-circulation of the cooled air and the heated air occurs. By way of example, cooled air may mix with heated air around the sides or over the tops of one or more of the racks 102-108.

The sides of the racks 102-108 that face the cool aisles 120 may be considered as the fronts of the racks and the sides of the racks 102-108 that face away from the cool aisles 120 may be considered as the rears of the racks 102-108. For purposes of simplicity and not of limitation, this nomenclature will be relied upon throughout the present disclosure to describe the various sides of the racks 102-108.

According to another example, the racks 102-108 may be positioned with their rear sides adjacent to one another (not shown). In this embodiment, the vent tiles 118 may be provided in each aisle 120 and 124. In addition, the racks 102-108 may comprise outlets on top panels thereof to enable heated air to flow out of the racks 102-108.

As described herein above, the CRAC units 114 generally operate to cool received heated air as indicated by the arrows 126. In addition, the CRAC units 114 may supply the racks 102-108 with airflow that has been cooled, through any reasonably suitable known manners and may thus comprise widely available, conventional CRAC units 114. For instance, the CRAC units 114 may comprise vapor-compression type air conditioning units, chiller type air conditioning units, etc. Examples of suitable CRAC units 114 may be found in co-pending and commonly assigned U.S. patent application Ser. No. 10/853,529, filed on May 26, 2004, and entitled "Energy Efficient CRAC Unit Operation," the disclosure of which is hereby incorporated by reference in its entirety.

Also shown in FIG. 1A is a computing device 128 configured to control various operations of the data center 100. The computing device 128 may be configured, for instance, to control the vent tiles 118 to thereby vary at least one of a direction and a volume flow rate of cooled airflow delivered through the vent tiles 118. In one regard, the computing device 128 may control the vent tiles 118 to move from fully closed positions to fully open positions. In addition, the computing device 128 may be configured to determine VTO as described herein below. Although the computing device 128 is illustrated in FIG. 1A as comprising a component separate from the components 116 housed in the racks 102-108, the computing device 128 may comprise one or more of the components 116 without departing from a scope of the data center 100 disclosed herein.

The data center 100 is illustrated in FIG. 1A as containing four rows of racks 102-108 and two CRAC units 114 for purposes of simplicity and illustration. Thus, the data center 100 should not be limited in any respect based upon the number of racks 102-108 and CRAC units 114 illustrated in FIG. 1A. In addition, although the racks 102-108 have all been illustrated similarly, the racks 102-108 may comprise heterogeneous configurations. For instance, the racks 102-108 may be manufactured by different companies or the racks 102-108 may be designed to house differing types of components 116, for example, horizontally mounted servers, bladed servers, etc.

Figure 1B:
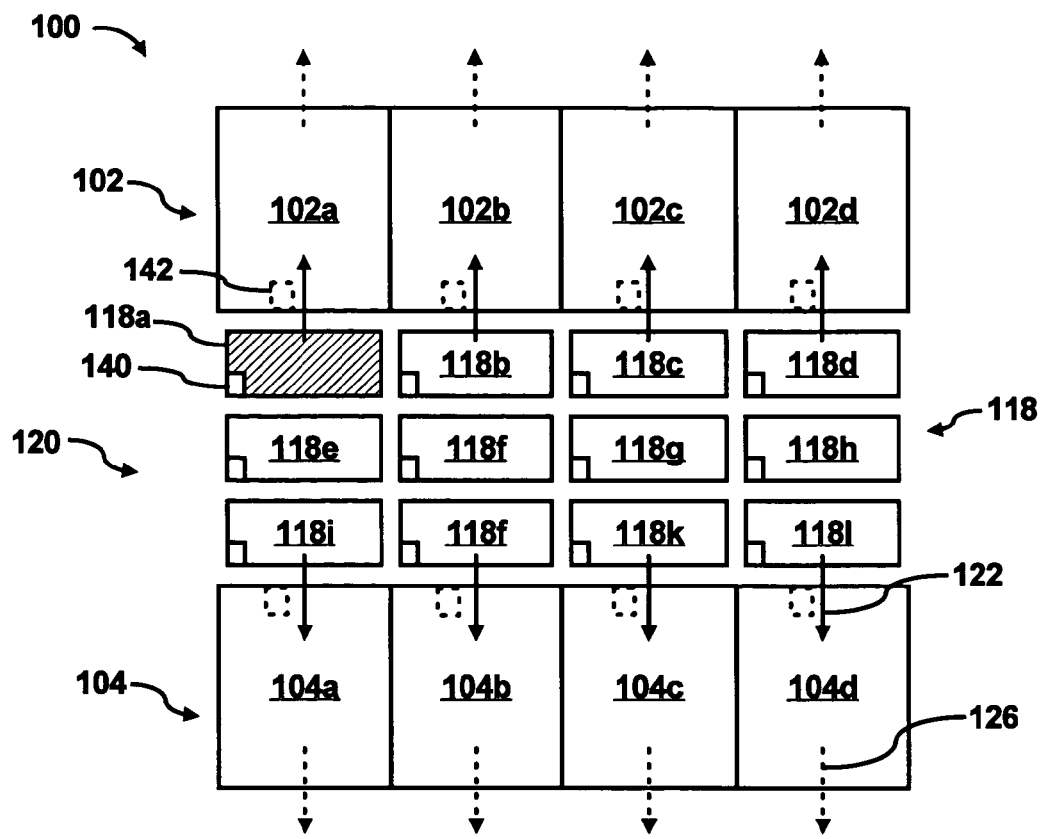
FIG. 1B illustrates a simplified plan view of a portion of the data center shown in FIG. 1A, according to an embodiment of the invention.

Various manners in which the cooled airflow is supplied by the vent tiles 118 to the racks 102-108 will be described in greater detail with respect to FIG. 1B. FIG. 1B illustrates a simplified plan view of a portion of the data center 100. More particularly, FIG. 1B illustrates the portion of the data center 100 including rows of racks 102 and 104 and a cool aisle 120. It should be understood that the description set forth herein below with respect to FIG. 1B is also applicable to the other rows of racks 106 and 108 and cool aisles 120.

The vent tiles 118 are illustrated in FIG. 1B as comprising a plurality of separately controllable vent tiles 118a-118l. The number of vent tiles 118a-118l depicted in FIG. 1B are for purposes of illustration only and are thus not meant to limit the data center 100 in any respect. In addition, although the vent tiles 118a-118l are shown as being positioned with respect to respective racks 102a-102d and 104a-104d, such placement of the vent tiles 118a-118l are also not to be construed as limiting the data center 100 in any respect.

The vent tiles 118a-118l are in fluid communication with a space 112 or plenum containing pressurized cooled air supplied into the space 112 by one or more CRAC units 114, as described in greater detail herein above with respect to FIG. 1A. For those vent tiles 118a-118l that are open, the cooled air may be supplied into an area above the vent tiles 118a-118l. The cooled air supplied into the area by the open vent tiles 118a-118l may be drawn into the racks 102a-102d and 104a-104d through openings or inlets in the racks 102a-102d and 104a-104d, as indicated by the arrows 122, in a variety of different manners. For instance, the components 116 housed in the racks 102a-102d and 104a-104d may include fans (not shown) operable to draw airflow into the front sides of the racks 102a-102d and 104a-104d and to discharge air out of the rear sides of the racks 102a-102d and 104a-104d. In addition or alternatively, the racks 102a-102d and 104a-104d may be equipped with one or more fans (not shown) configured to create similar airflows through the racks 102a-102d and 104a-104d. The vent tiles 118a-118l may also be designed to assist in the supply of airflow through the racks 102a-102d and 104a-104d through control of the direction of the airflow supplied.

As the cooled air flows through the racks 102a-102d and 104a-104d and therefore the components 116, the cooled air may become heated by absorbing heat dissipated from the components 116. The heated air may exit the racks 102a-102d and 104a-104d through one or more outlets located on the rear sides of the racks 102a-102d and 104a-104d, as indicated by the arrows 126.

The vent tile 118a is illustrated as being in a fully closed position; whereas, the vent tiles 118b-118l are illustrated as being in fully open positions. However, the rack 102a may still draw cooled airflow from the area above the vent tiles 118a-118l as indicated by the arrow 122. The airflow drawn into the rack 102a may comprise airflow supplied into the area by one or more of the vent tiles 118b-118l. In addition, the airflow drawn into the rack 102a, as well as the other racks 102b-102d and 104a-104d, may also comprise airflow that has been heated, for instance, in one or more of the racks 102a-102d and 104a-104d. This airflow may be considered as re-circulated airflow since the heated airflow may have re-circulated into the cooled airflow.

The vent tiles 118a-118l may each include sensors 140 configured to detect the level or percentage at which the respective vent tiles 118a-118l are open. The sensors 140 may comprise any reasonably suitable commercially available device for detecting or for enabling the calculation of the level or percentage to which the vent tiles 118a-118l are open. For instance, the sensors 140 may comprise encoders configured to detect movement of movable louvers or vanes configured to vary the degree to which the vent tiles 118a-118l are open and thereby vary the mass flow rate of airflow supplied through the vent tiles 118a-118l.

Figure 1C:
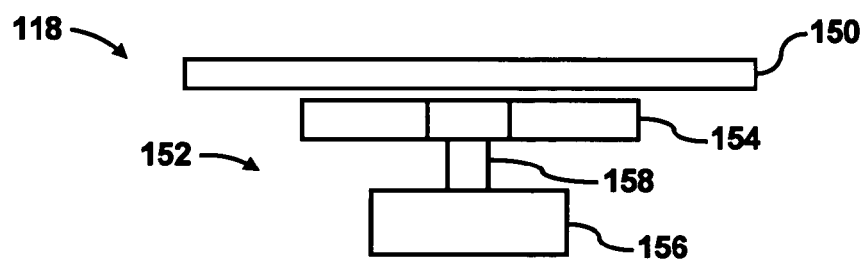
FIG. 1C illustrates a simplified side elevational view of an example of a vent tile shown in FIG. 1B.

Alternatively, some or all of the vent tiles 118a-118l may also comprise fans, as shown in FIG. 1C. FIG. 1C illustrates a simplified side elevational view of a vent tile 118a-118l having a cover 150 and a fan assembly 152. The cover 150 includes a plurality of openings (not shown) to enable substantially unimpeded airflow through the cover 150. The fan assembly 152 includes a fan 154 connected to a motor 156 by a rod 158. The motor 156 may be operated at various speeds to thereby vary the speed of the fan 154 and thus the mass flow rate of air supplied through the cover 150. The vent tiles 118a-118l may be considered as being closed when the fans 154 are not rotating. In addition, the different speeds at which the fans 154 are rotated may be equivalent to the percentages that the vent tiles 118a-118l are considered open. Thus, for instance, if a vent tile 118a-118l is considered as being 90% open, an equivalent state for a vent tile 118a-118l equipped with a fan 154 is when the fan 154 is operated at 90% of its maximum rated speed. The sensors 140 may detect the speeds of the fans 154 by detecting the operations of the motors 156. For instance, the sensors 140 may comprise encoders configured to detect the speed at which the motor 156 is rotating, power meter to detect the power draw of the motor 156, and the like.

The racks 102a-102d and 104a-104d, may each also include sensors 142 configured to detect one or more conditions of the airflow drawn through the racks 102a-102d and 104a-104d. The sensors 142 may, for instance, be equipped to detect the respective temperatures of the air flowing into each of the racks 102a-102d and 104a-104d and may thus, include thermistors, thermocouples, or the like.

Figure 2:
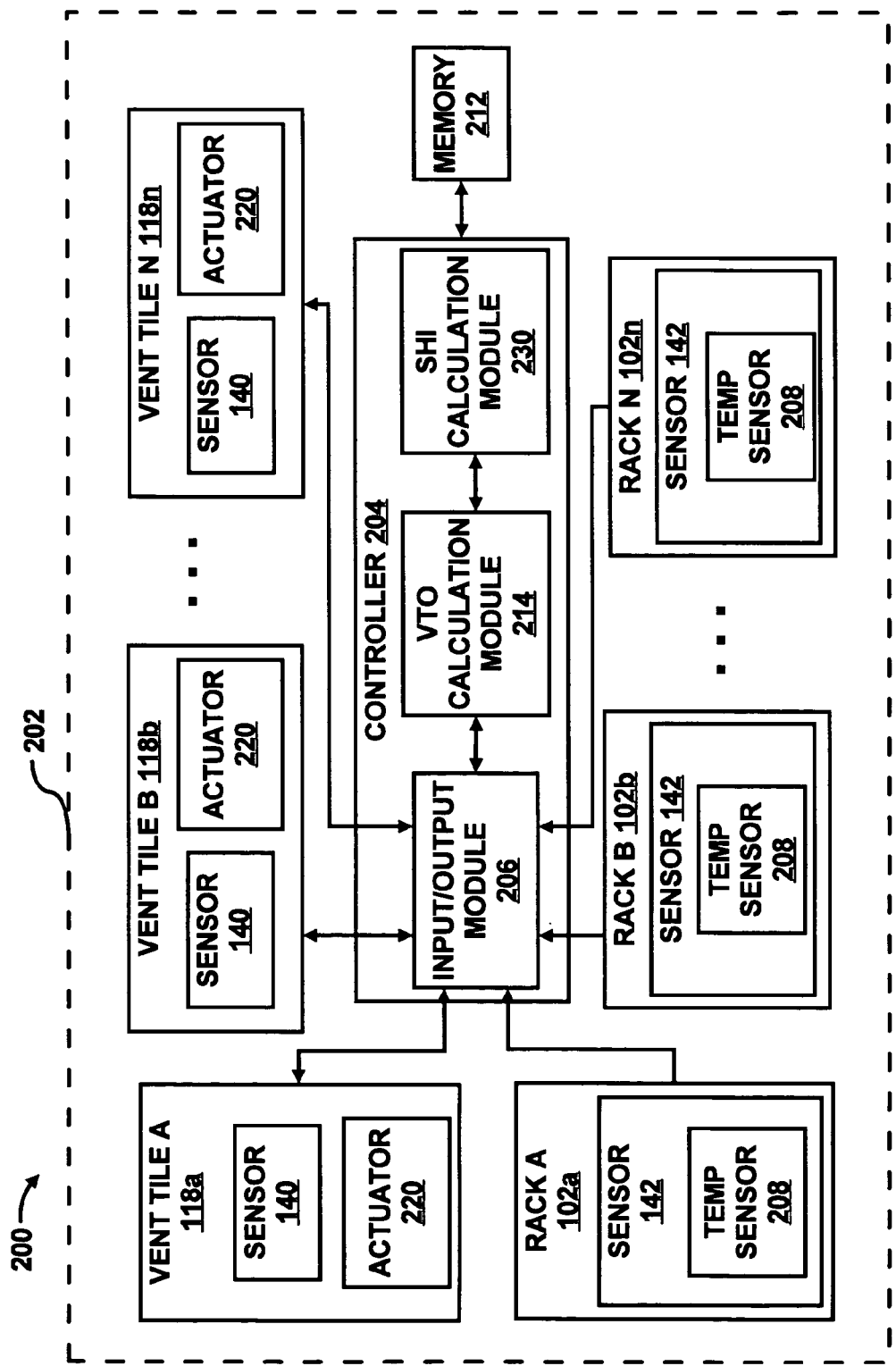
FIG. 2 is a block diagram of a vent tile opening index evaluation system according to an embodiment of the invention.

FIG. 2 is a block diagram 200 of a vent tile opening index evaluation system 202. It should be understood that the following description of the block diagram 200 is but one manner of a variety of different manners in which such a system 202 may be operated. In addition, it should be understood that the system 202 may include additional components and that some of the components described may be removed and/or modified without departing from a scope of the system 202.

The system 202 includes a controller 204 configured to control the operations of the system 202. The controller 204 may, for instance, comprise the computing device 128 shown in FIG. 1A. In addition or alternatively, the controller 204 may comprise a different computing device, a microprocessor, a micro-controller, an application specific integrated circuit (ASIC), and the like. In general, the controller 204 is configured to receive data from various components in the data center 100, to process the data to calculate a vent tile opening index, and to output the vent tile opening index, as described in greater detail herein below.

The controller 204 includes an input/output module 206 configured to receive data pertaining to measured or estimated conditions detected at a variety of locations in the data center 100. The input/output module 206 may also be configured to output various commands and other data by the controller 204 as described below. As shown in FIG. 2, the input/output module 206 is configured to receive data from the sensors 140 of a plurality of vent tiles 118a-118n and from the sensors 142 of a plurality of racks 102a-102n. The data received from the sensors 140 may include the percentages that the vent tiles 118a-118n are open. In addition, the data received from the sensors 142 may include, for instance, temperature information detected by temperature sensors 208.

In certain instances, the sensors 140 may also comprise sensors configured to detect the temperature of airflow supplied through the vent tiles 118a-118n. In this regard, the sensors 140 may comprise thermometers, thermocouples, thermistors, etc. In addition, the temperature information detected by the sensors 140 may also be sent to the input/output module 206.

The controller 204 may receive data from the sensors 140 and 142 through any reasonably suitable means. For instance, communications between the controller 204 and the sensors 140 and 142 may be effectuated through wired connections or through wireless protocols, such as IEEE 801.11b, 801.11g, wireless serial connection, Bluetooth, etc., or combinations thereof. In one regard, the input/output module 206 may thus also function as an adapter to enable the transfer of data from the sensors 140 and 142 to the controller 204.

Although the vent tiles 118a-118n and the racks 102a-102n are illustrated as including sensors 140 and 142, respectively, alternative means for detecting the temperatures and/or the vent tile openings at these locations may be employed without departing from a scope of the system 202. For instance, the temperatures and/or the vent tile openings may be detected by hand with a handheld device and inputted into the controller 204. As another example, the temperatures and/or vent tile openings may be detected with an adequately equipped semi-autonomous mobile sensor device (not shown). More particularly, the semi-autonomous mobile sensor device may be configured to travel around the vent tiles 118a-118n and the racks 102a-102n to detect the temperatures of air and/or the vent tile openings at these locations and to communicate this information to the controller 204. In this regard, the semi-autonomous mobile sensor device may function to gather environmental condition information while requiring substantially fewer sensors in the data center 100. A more detailed description of the semi-autonomous mobile sensor device and its operability may be found in U.S. Pat. No. 7,114,555, issued on Oct 3, 2006 to Chandrakant Patel et al., the disclosure of which is hereby incorporated by reference in its entirety.

In any regard, the data received by the controller 204 via the input/output module 206 may be stored in a memory 212. The memory 212 may also generally be configured to provide storage of software that provides the functionality of the controller 204. In one regard, the memory 212 may be implemented as a combination of volatile and non-volatile memory, such as DRAM, EEPROM, flash memory, and the like.

The data stored in the memory 212 may be accessed by a vent tile opening index (VTO) calculation module 214. In addition, the memory 212 may comprise software or algorithms that the VTO calculation module 214 may implement in calculating the VTO. Although the VTO calculation module 214 has been shown in FIG. 2 as forming part of the controller 204, the functionality of the VTO calculation module 214 may instead form part of the memory 212 without departing from a scope of the system 202.

In general, the VTO calculation module 214 operates to calculate the VTO for one or more racks 102a-102n. In other words, the VTO calculation module 214 is configured to determine how changes in the operations of various vent tiles 118a-118n affect the temperatures of airflow delivered into the various racks 102a-102n. Thus, for instance, the VTO may be used to determine how one or more vent tiles 118a-118n should be manipulated to vary the inlet temperatures of one or more of the racks 102a-102n. Through this knowledge, the temperatures of airflow through particular racks 102a-102n may substantially be controlled through a controlled variance in the openings of one or more of the vent tiles 118a-118n.

The racks 102a-102n may comprise some or all of the racks 102-108 shown and described with respect to FIG. 1A. In addition, the vent tiles 118a-118n may comprise some or all of the vent tiles 118 shown and described in FIGS. 1A-1C. References to the racks 102a-102n and the vent tiles 118a-118n are not intended to limit the system 202 in any respect, but are made to simplify the illustration and description of these elements.

Various manners in which the VTO may be calculated by the VTO calculation module 214 will now be described in greater detail. As stated herein above, the system 202 may be employed to commission the vent tiles 118a-118n in a data center 100. With respect to the equations set forth below, prior knowledge of rack 102a-102n and vent tile 118a-118n locations may be beneficial since this may reduce the number of VTOs calculated and the unknowns in the system of equations. However, in order to obtain the most accurate correlations between the racks 102a-102n and the vent tiles 118a-118n, the VTOs may be calculated for all possible rack 102a-102n and vent tile 118a-118n combinations.

According to an example, the VTOs for some of the vent tiles 118a-118n may be determined through approximation. In this example, a model may be created a priori to determine which of the vent tiles 118a-118n most affect a particular rack 102a-102n and to determine the VTOs for vent tiles 118a-118n that have relatively less effect on the particular rack 102a-102n by approximation. The approximated VTOs for the vent tiles 118a-118n may be based, for instance, upon their distances from the particular rack 102a-102n. Thus, those vent tiles 118a-118n that are closer to the particular rack 102a-102n may have higher approximated VTOs than those vent tiles 118a-118n that are farther from the particular rack 102a-102n. In this regard, the VTOs for all of the possible rack 102a-102n and vent tile 118a-118n combinations may not need to be determined, thus reducing the amount of time required to determine all of the VTOs.

The relationship between any particular vent tile 118a-118n and any particular rack 102a-102n may be evaluated to determine how the particular vent tiles 118a-118n influence the cooled air supplied to particular racks 102a-102n. This relationship is described herein as the VTO, which, in one respect, relates the level at which vent tiles 118a-118n are open to the change in inlet temperatures of one or more racks 102a-102n. The VTO may also relate to the speed at which a fan 154 associated with a vent tile 118a-118n is operating to the change in inlet temperatures of one or more racks 102a-102n. This relationship may be written in matrix form as follows:

$$[VTO] = [\Delta T_R] \cdot [\Delta TO]^{-1}, \quad \text{Equation (1)}$$

where $[\Delta T_R]$ is a matrix of changes in inlet temperatures of air delivered to each rack 102a-102n and $[\Delta TO]$ is a tile opening matrix of each vent tile 118a-118n, of a particular group of racks 102a-102n and vent tiles 118a-118n. For purposes of simplicity, the vent tile openings and vent tile fan speeds are considered to be synonymous. Thus, where reference is made in the present disclosure that a vent tile 118a-118n is open to a certain percentage, this reference is to be understood as also being equivalent to a vent tile fan 154 being operated to that percentage. For instance, if a vent tile 118a-118n is considered as being 90% open, an equivalent state for a vent tile 118a-118n equipped with a fan 154 is when the fan 154 is operated at 90% of its maximum rated speed.

As may be seen from Equation (1), the matrix VTO may be determined through multiplication of the matrix $[\Delta T_R]$ by the matrix $[\Delta TO]$. In this regard, the VTO may be determined through variations in the inlet temperatures of the racks 102a-102n and the percentages at which the vent tiles 118a-118n are open or operated. In this regard, the vent tiles 118a-118n may include means for varying the airflow volumes through the vent tiles 118a-118n. The means for varying the airflow volumes may be manipulated by hand or they may be remotely actuated. In certain instances, for example, the vent tiles 118a-118n may include actuators 220 for controlling the means for varying the airflow volumes. In these instances, in determining the matrix VTO, the actuators 220 may be configured to vary the opening levels of particular vent tiles 118a-118n during different runs. A more detailed description of various manners in which the VTO may be determined according to various vent tile 118a-118n settings is set forth herein below.

The vent tile actuators 220 may comprise actuators configured to vary the airflows through the vent tiles 118a-118n. Examples of suitable vent tile actuators 220 and vent tiles 118a-118n configured to vary the cooling fluid flow there through may be found in commonly assigned U.S. Pat. No. 6,694,759, entitled "Pressure Control of Cooling Fluid Within a Plenum Using Automatically Adjustable Vents", filed on Jan. 27, 2003, the disclosure of which is hereby incorporated by reference in its entirety. A discussion of various operational modes for these types of vents is disclosed in U.S. Pat. No. 6,574,104, which is also commonly assigned and hereby incorporated by reference in its entirety. In addition, the vent tile actuators 220 may comprise the motors 156 of the fan assemblies 152 depicted in FIG. 1C. Thus, for instance, the mass flow rates of airflow supplied through the vent tiles 118a-118n may be varied through varying of the motor 156 operations.

In addition, Equation (1) may be rearranged as follows:

$$[\Delta T_R] = [VTO] \cdot [\Delta TO]. \quad \text{Equation (2)}$$

As may be seen in Equation (2), for instance, if it is determined that the inlet temperature at a rack 102a-102n is above or below a predetermined set point temperature, and the VTO is known, vent tile 118a-118n openings may be varied by a given delta ($\Delta$) according to the degree to which the inlet temperature is above or below the set point temperature.

In certain instances, the airflow supplied into the racks 102a-102n includes airflow that has not been directly supplied through one or more of the vent tiles 118a-118n. Instead, some of the airflow may include airflow that has been re-circulated into the supply airflow. This airflow may include, for instance, airflow that has been heated in one of more of the racks 102a-102n and exhausted into the data center 100. As this re-circulated airflow may affect the temperature of the airflow supplied to the racks 102a-102n, this airflow may be considered in determining VTO. More particularly, Equation (2) may be re-written to include the effects of re-circulation in terms of a re-circulation temperature matrix $\Delta RM_{temp}$ that accounts for the influence of re-circulation on the rack inlet temperatures as follows:

$$[\Delta T_R] = [[VTO]\cdot[\Delta TO]] + [\Delta RM_{temp}], \quad \text{Equation (3)}$$

The values that populate the matrix $[\Delta RM_{temp}]$ may be determined through a calculation of the re-circulated airflow infiltration levels into the airflow supplied by the vent tiles 118a-118n into the racks 102a-102n. More particularly, the matrix $[\Delta RM_{temp}]$ is the change in temperature at a rack 102a-102n due to the change in re-circulation that occurs when a vent tile 118a-118n is adjusted. In addition, for a given rack, for instance, rack 102a, the re-circulation matrix $[RM_{temp}]$ may be considered as being identical to difference in the temperature of air that exits the rack 102a and the temperature of the air that enters the rack 102a, when the effect of heat dissipation to the ambient is neglected. Thus, the matrix $[\Delta RM_{temp}]$ may be written as follows:

Equation (4):

$$[\Delta RM_{temp}] = [\Delta(T_{out} - T_{in})] = \left[\Delta\left\{(T_{in} - T_{ref}) * \frac{(1-SHI)}{SHI}\right\}\right].$$

In Equation (4), the $\Delta T_{in}$ may be equivalent to the $\Delta T_R$, $\Delta T_{out}$ is the change in temperature at the outlet of the rack 102a, and the $\Delta T_{ref}$ is equivalent the temperature of the airflow supplied through the vent tiles 118a-118n. SHI or supply heat index is an index of air re-circulation and may be defined by the following equation:

Equation (5):

$$SHI = \frac{\delta Q}{Q + \delta Q},$$

where Q represents the total heat dissipation from all the components in the racks 102a-102n of the data center 100 and $\delta Q$ represents the rise in enthalpy of the airflow before entering the racks 102a-102n. The SHI and manners in which it may be determined are described in greater detail in U.S. Pat. Ser. No. 7,051,946, issued on May 30, 2006 to Cullen Bash et al. and entitled "Air Recirculation Index", the disclosure of which is hereby incorporated by reference in its entirety.

The relationship between the matrix of the re-circulation mass flow rate $\Gamma$ and SHI may be represented as follows:

Equation (6):

$$\Gamma^* \approx \frac{\delta Q}{Q} = \frac{SHI}{1-SHI},$$

where $\Gamma^*$ is the dimensionless form of $\Gamma$. Thus, by determining SHI, the matrix of re-circulation mass flow rate $\Gamma$ may also be determined for the racks 102a-102n. In this regard, the controller 204 may optionally comprise an SHI calculation module 230 as shown in FIG. 2. The SHI calculation module 230 is generally configured to calculate SHI values and to communicate those values to the VTO calculation module 214. The VTO calculation module 214 may factor the SHI values in calculating the VTO matrix of Equation (3).

Equation (3) may be re-written with these elements as follows:

Equation (7):

$$[\Delta T_R] = [[VTO]\cdot[\Delta TO]] + \left[\Delta\left\{\frac{T_R - T_{ref}}{\Gamma^*}\right\}\right],$$

In most instances, and in situations where the vent tiles 118a-118n are not equipped with temperature sensors 140, it may be assumed that the change in re-circulation at a rack 102a-102n due to the adjustment of a single vent tile 118a is insignificant. Therefore, it may be assumed then that $[\Delta RM_{temp}] \rightarrow [0]$ and Equations (3) and (7) may be equivalent to Equation (2).

In determining VTO, a total of m runs may be performed while measuring data at the racks 102a-102n to calculate the VTOs for all of the rack 102a-102n and vent tile 118a-118n combinations. Therefore, for each rack 102a-102n, m number of equations is solved to determine all of the VTO values. Various manners in which VTO may be calculated according to performance of a number of runs will now be described in greater detail herein below with reference first to FIG. 3A.

Figure 3A:
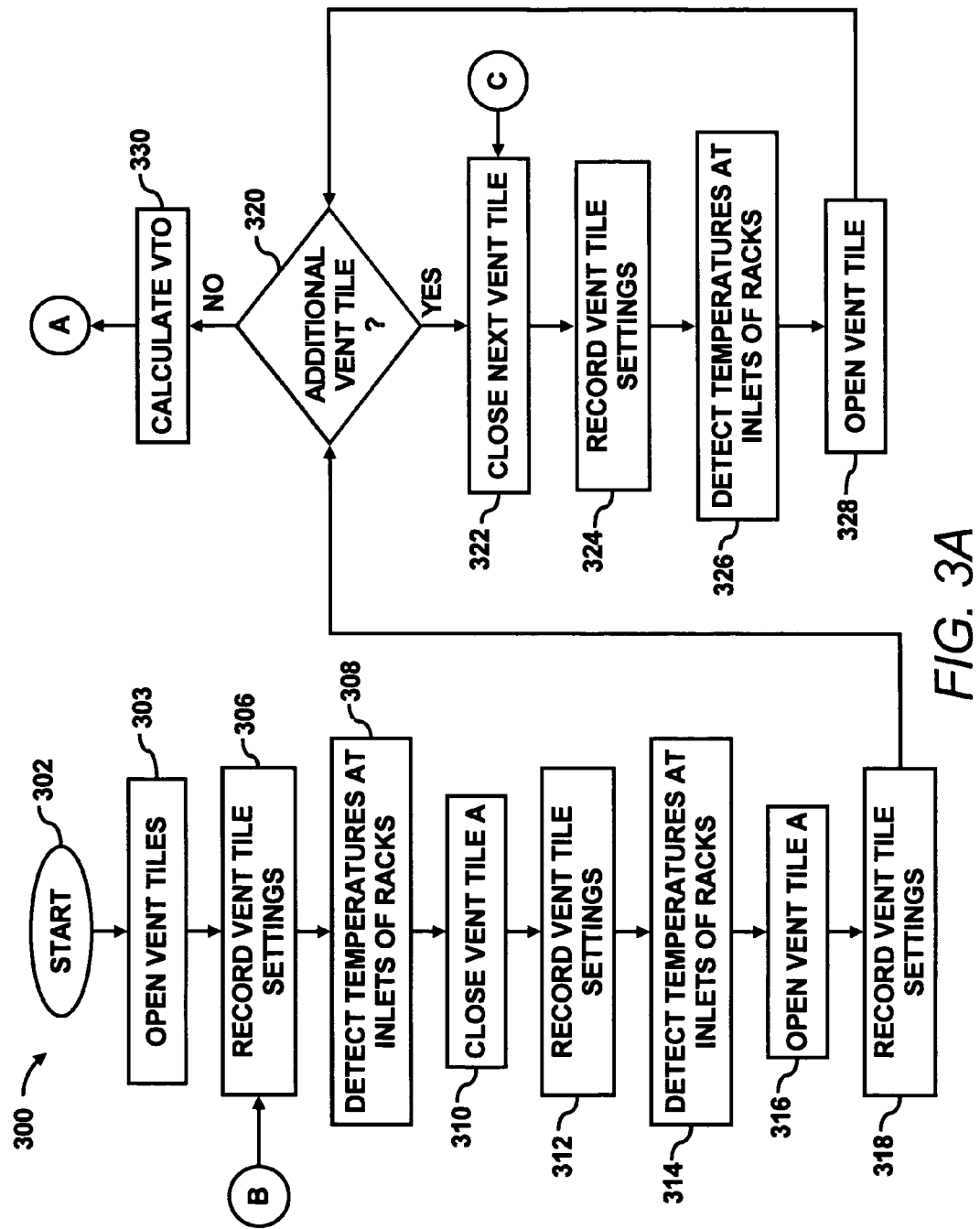
FIG. 3A illustrates a flow diagram of an operational mode for determining a vent tile opening index (VTO), according to an embodiment of the invention.

FIG. 3A illustrates a flow diagram of an operational mode 300 for determining a vent tile opening index (VTO). It is to be understood that the following description of the operational mode 300 is but one manner of a variety of different manners in which the VTO could be determined. It should also be apparent to those of ordinary skill in the art that the operational mode 300 represents a generalized illustration and that other steps may be added or existing steps may be removed or modified without departing from the scope of the operational mode 300. The description of the operational mode 300 is made with reference to the block diagram 200 illustrated in FIG. 2, and thus makes reference to the elements cited therein.

The operational mode 300 may be initiated in response to a variety of stimuli at step 302. For example, the operational mode 300 may be initiated in response to a predetermined lapse of time, in response to receipt of a transmitted signal, manually initiated, etc. At step 304, all of the vent tiles 118a-118n of a particular group of vent tiles 118a-118n may be opened (or fan assemblies 152 may be activated). The particular group of vent tiles 118a-118n may include a particular rack 102a-102n, a plurality of racks in a group of racks 102a-102n, all of the racks 102a-102n in a data center 100, etc. In addition, the particular group of vent tiles 118a-118n may comprise all of the vent tiles 118a-118n in a particular row, all of the vent tiles 118a-118n that are supplied with cooled airflow by a particular CRAC unit 114, all of the vent tiles 118a-118n that are supplied with cooled airflow by a plurality of CRAC units 114, etc.

In one example, the vent tiles 118a-118n may be opened to 100% open. In other examples, the vent tiles 118a-118n may be opened to various levels and the operational mode 300 may be repeated at the various levels. For instance, during a first iteration of the operational mode 300, the vent tiles 118a-118n may be opened to 100% open, to 90% open during a second iteration, to 80% open during a third iteration, and so forth. Determination of VTO at the various vent tile 118a-118n settings may be beneficial since VTO may change during operation of the vent tiles 118a-118n. More particularly, as the global set of vent tiles 118a-118n change, so too will the VTO. Thus, if the global set of vent tile 118a-118n configurations changes, the correct VTO$_i$, where i=global vent tile 118a-118n configuration, may be employed to determine the relationships between the racks 102a-102n and the vent tiles 118a-118n.

At step 306, the settings of the vent tiles 118a-118n may be recorded, for instance, in the memory 212. The settings may include the percentages to which the vent tiles 118a-118n are open, the speeds of the fans 154, etc. In any regard, at step 308, the temperatures at the inlets of the racks 102a-102n may be detected with the temperature sensors 208 at the recorded vent tile 118a-118n settings. The inlet temperatures may also be detected through any of the various other means described hereinabove. In any respect, the detected inlet temperatures may be transmitted or otherwise sent to the input/output module 206 and may also be stored in the memory 212.

At step 310, one of the vent tiles 118a-118n, for instance, vent tile 118a, may be closed to substantially prevent the flow of air therethrough. Alternatively, the fan 154 of one of the vent tiles 118a-118n may be deactivated or otherwise turned off. The selection of which one of the vent tiles 118a-118n to close may be predetermined or it may be random. In any respect, the settings of the vent tiles 118a-118n may be recorded at step 312 and the temperatures at the inlets of the racks 102a-102n may be detected at step 314 at the recorded settings.

The vent tile 118a that was closed at step 310 may be opened at step 316. This vent tile 118a may be opened to the percentage it was open at step 304. In addition, the settings of the vent tiles 118a-118n may again be recorded at step 318.

At step 320, it may be determined whether another vent tile 118a-118n is to be closed. In one example, the "yes" condition may be reached at step 320 until conditions for each of the vent tiles 118a-118n being in closed positions have been determined. In another example, the "yes" condition at step 320 may be reached for a predetermined number of vent tiles 118a-118n equaling less than all of the vent tiles 118a-118n. In any respect, the determination of whether to close another vent tile 118a-118n may be made by the controller 204.

If it is determined that another vent tile 118a-118n is to be closed, another vent tile 118a-118n, for instance, vent tile 118b, may be closed at step 322. Again, the selection of which one of the vent tiles 118a-118n to close may be predetermined or it may be random. In any respect, the settings of the vent tiles 118a-118n may be recorded at step 324 and the temperatures at the inlets of the racks 102a-102n may be detected at step 326 at the recorded settings.

The vent tile 118b that was closed at step 322 may be opened at step 328. This vent tile 118b may also be opened to the percentage it was open at step 304.

Following step 328, it may be determined if another vent tile 118a-118n is to be closed at step 320. Steps 320-328 may be repeated for a predetermined number of times or until the conditions for each of the vent tiles 118a-118n being closed have been determined. In this case, which equates to a "no" condition at step 320, the controller 204 may calculate the VTO, as indicated at step 330. More particularly, the VTO calculation module 214 of the controller 204 may calculate the VTO based upon the information regarding the temperatures detected at the inlets of the racks 102a-102n at the various vent tile 118a-118n settings. That is, the rack 102a-102n inlet temperatures with various vent tiles 118a-118n being closed. As described in greater detail herein above, the VTO calculation module 214 may be configured to calculate the VTO in matrix form according to Equation (1).

Although the operational mode 300 may end following calculation of the VTO at step 330, optional procedures may be implemented in various circumstances. The optional procedures may be implemented, for instance, in cases where the blowers of CRAC units 114 are over-provisioned, which may lead to an excessive amount of airflow being supplied from the vent tiles 118a-118n. In some instances, this excessive flow may cause the airflow to dramatically exceed the flow necessary for the racks 102a-102n. In these instances, evaluation of VTO may not be possible. To overcome this possibility, the optional procedures depicted in FIGS. 3B and 3C may be implemented as alternative optional procedures.

In other instances, the mass flow rates of air supplied through the vent tiles 118a-118n may fall below or exceed the required mass flow rates of air required to safely operate the equipment housed in the racks 102a-102n. In these instances, an optional pre-commissioning procedure depicted in FIG. 3D may be implemented to substantially overcome these possibilities.

Figure 3B:
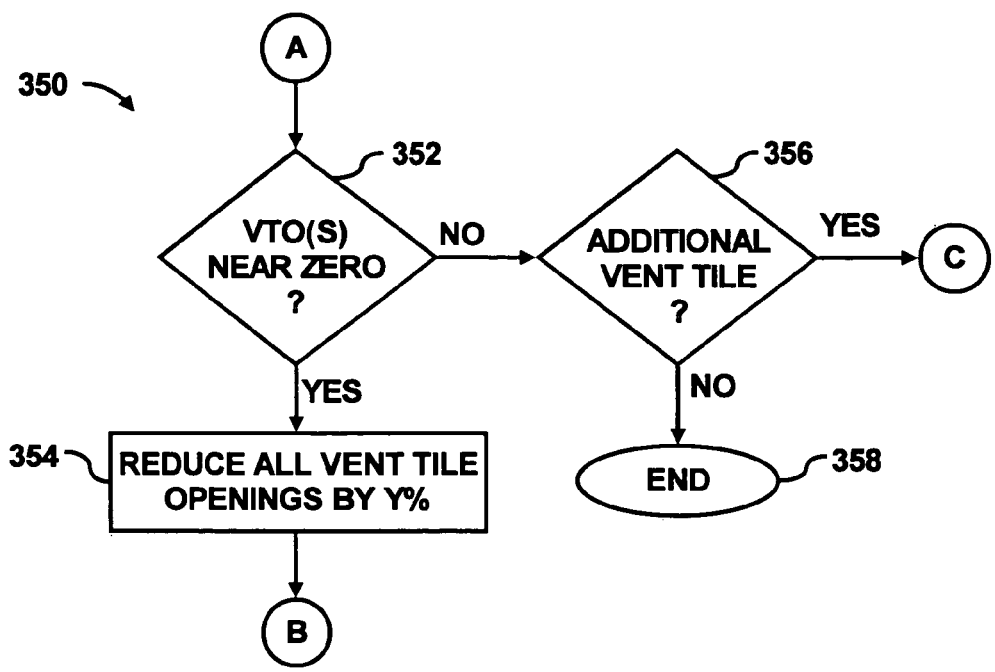
FIGS. 3B and 3C illustrate optional, alternative operational modes for correcting improper VTO determinations, according to embodiments of the invention.

With reference first to FIG. 3B, there is shown an operational mode 350 of a first optional method. As shown, following calculation of the VTO for a predetermined number of vent tiles 118a-118n, it is determined whether the values calculated for these vent tiles 118a-118n are near zero at step 352. If it is determined that the VTO values are near zero, the openings in the vent tiles 118a-118n or the speeds of the fans 154 may be reduced by a predetermined amount, for instance, Y %. The predetermined amount (Y) may be determined, for instance, through a trial and error process. By way of example, the vent tiles 118a-118n may be reduced by a 10% reduction and may be reduced by 10% increments for subsequent iterations of step 354. If it is found that the 10% reduction does not change VTO, then the predetermined amount may be increased. In one example, the reduction in the openings of vent tiles 118a-118n may be ceased when the vent tile 118a-118n openings have reached or are near limits prescribed for safe operation of the components 116. In addition, steps 306-330 may be repeated with the openings of the vent tiles 118a-118n reduced by the predetermined amount. Moreover, steps 352-358 may also be performed following steps 306-330.

If it is determined that the VTO values are not near zero at step 352, it may be determined whether additional vent tiles 118a-118n are to be closed at step 356. The determination made at step 356 is similar to the determination made at step 320. Thus, for instance, if the VTO was calculated for a smaller number of vent tiles 118a-118n than the entire set of vent tiles 118a-118n to be considered, then it may be determined that additional vent tiles 118a-118n are to be considered and steps 322-330 may be repeated. In addition, steps 352-358 may also be performed depending upon the outcome of the VTO calculation performed at step 330.

If, however, it is determined that no further vent tiles 118a-118n are to be considered at step 356, the operational modes 300 and 350 may end as indicated at step 358. The end condition at step 358 may comprise a standby mode since the operational modes 300 and 350 may be re-initiated in response to a receipt of a signal to re-initiate, after a predetermined lapse of time, manually re-initiated, etc.

Figure 3C:
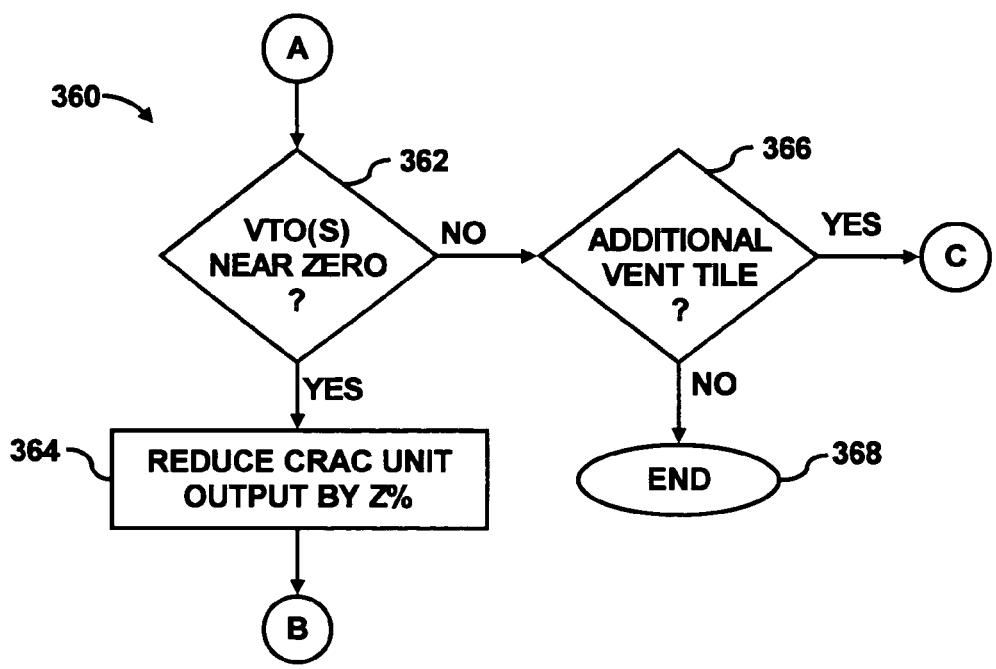

With reference now to FIG. 3C, there is shown an operational mode 360 of a second optional method. As shown, following calculation of the VTO for a predetermined number of vent tiles 118a-118n, it is determined whether the values calculated for these vent tiles 118a-118n are near zero at step 362. If it is determined that the VTO values are near zero, the outputs of one or more CRAC units 114 may be reduced by a predetermined amount, for instance, Z %. The predetermined amount (Z) may be determined, for instance, through a trial and error process. By way of example, the outputs of one or more CRAC units 114 may be reduced by 10% and may be further reduced by 10% increments for subsequent iterations of step 364. If it is found that the 10% reduction does not change VTO, then the predetermined amount may be increased. However, the level to which the outputs of the one or more CRAC units 114 are reduced may be limited based upon the operational requirements of the one or more CRAC units 114. These operational requirements may include minimum allowable temperature set points or blower output set points.

The outputs of the one or more CRAC units 114 may be reduced, for instance, by reducing the speed of the blowers configured to supply cooled airflow into the space 112. In addition, steps 306-330 may be repeated with the outputs of the one or more CRAC units 114 reduced by the predetermined amount. Moreover, steps 362-368 may also be performed following steps 306-330.

As with the operational mode 350, if it is determined that all of the VTO values are not near zero at step 362, it may be determined whether additional vent tiles 118a-118n are to be closed at step 366. The determination made at step 366 is similar to the determination made at step 320. Thus, for instance, if the VTO was calculated for a smaller number of vent tiles 118a-118n than the entire set of vent tiles 118a-118n to be considered, then it may be determined that additional vent tiles 118a-118n are to be considered and steps 322-330 may be repeated. In addition, steps 362-368 may also be performed depending upon the outcome of the VTO calculation performed at step 330.

If, however, it is determined that no further vent tiles 118a-118n are to be considered at step 366, the operational modes 300 and 360 may end as indicated at step 368. The end condition at step 368 may comprise a standby mode since the operational modes 300 and 360 may be re-initiated in response to a receipt of a signal to re-initiate, after a predetermined lapse of time, manually re-initiated, etc.

Figure 3D:
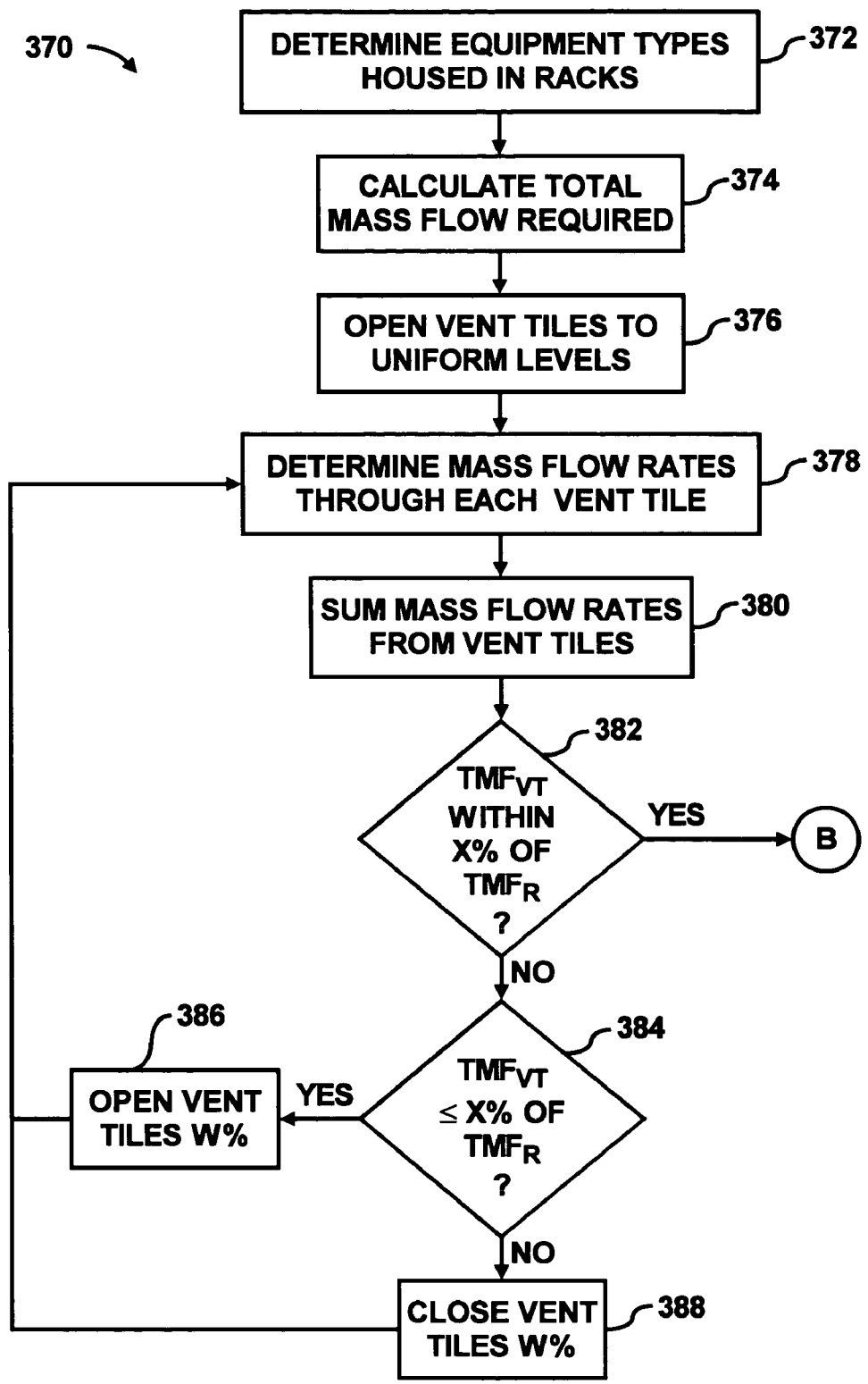
FIG. 3D illustrates an optional pre-commissioning operational mode according to an embodiment of the invention.

Referring to FIG. 3D, there is shown an operational mode 370 of an optional pre-commissioning method. The operational mode 370 may be performed prior to step 306 to generally enable a determination of whether the total mass flow rate of air through the vent tiles 118a-118n is sufficient for the mass flow rates required by the equipment housed in the racks 102a-102n. In addition, the operational mode 370 may be performed to determine whether the total mass flow rates of air supplied through the vent tiles 118a-118n exceeds a predetermined level. The flow rates of air through the vent tiles 118a-118n may also be varied through implementation of the operational mode 370, such that the total mass flow rate of air supplied through the vent tiles 118a-118n is within a predefined percentage of the total mass flow rate required by the equipment housed in the racks 102a-102n. In one example, the operational mode 370 may be implemented to determine the level to which the vent tiles 118a-118n are opened at step 304.

As shown in FIG. 3D, the types of equipment housed in the racks 102a-102n may be determined at step 372. This information may be compiled into a table or chart and stored in the memory 212. In addition, the table or chart may include information pertaining to the mass flow rates of air required by the equipment to be safely operated. Alternatively, this information may include recommended airflow rates for the equipment. In any respect, the total mass flow rates of air required to operate the equipment may be calculated at step 374, for instance, by totaling the individual airflow requirements of each piece of equipment.

At step 376, the vent tiles 118a-118n may all be opened to uniform levels, such that the mass flow rates of airflow supplied through the vent tiles 118a-118n are approximately equivalent for each of the vent tiles 118a-118n. The vent tiles 118a-118n may be set between, for instance, around 25-100% open. At step 378, the mass flow rates of air supplied through each of the vent tiles 118a-118n may be determined. The mass flow rates of airflow supplied through each of the vent tiles 118a-118n may be detected through use of mass flow rate sensors (not shown). Alternatively, the mass flow rates of airflow may be estimated through various other means. For instance, the mass flow rates may be estimated through use of temperature drop detection along with power draw detection, pressure differences across the vent tiles 118a-118n, fan speeds, etc.

In addition, the mass flow rates of air supplied through each of the vent tiles 118a-118n may be summed to obtain a total mass flow rate amount at step 380. At step 382, the total mass flow rate (TMF) of air supplied through each of the vent tiles 118a-118n (TMF$_{VT}$) is compared with the total mass flow rate (TMF) of air required by the equipment housed in the racks 102a-102n (TMF$_R$) to determine whether the TMF$_{VT}$ is within a predetermined percentage (X %) of the TMF$_R$. Although the comparison between the flow rates at step 382 has been described with percentages, the comparison may be based upon any other reasonably suitable method of determining whether values are within a predetermined range from other values. For instance, the comparison may be based upon preset difference in flow rate value, etc.

In addition, the predetermined percentage (X %) may comprise any reasonably suitable percentage value and may be user-defined. According to an example, the predetermined percentage (X %) may be approximately 10-20%.

In any regard, if the TMF$_{VT}$ is within the predetermined percentage (X %) of the TMF$_R$, the operational mode 370 may end and the operational mode 300 may be performed beginning at step 304. In addition, the vent tiles 118a-118n may be at the level of opening indicated at step 376. However, if the TMF$_{VT}$ is not within the predetermined percentage (X %) of the TMF$_R$, it may be determined as to whether the TMF$_{VT}$ falls below or equals the predetermined percentage (X %) of the TMF$_R$. at step 384.

If the TMF$_{VT}$ falls below or equals the predetermined percentage (X %) of the TMF$_R$, the vent tiles 118a-118n may be opened by a predefined percentage (W %), as indicated at step 386. The predefined percentage (W) may be determined, for instance, through a trial and error process. By way of example, the openings of the vent tiles 118a-118n may be increased by 10% and may be further increased by 10% increments for subsequent iterations of step 386. If it is found that the 10% increase does not change VTO, then the predefined percentage (W) may be increased. In addition, steps 378-388 may be repeated until it is determined that the TMF$_{VT}$ is within the predetermined percentage (X %) of the TMF$_R$.

If the TMF$_{VT}$ exceeds the predetermined percentage (X %) of the TMF$_R$, the vent tiles 118a-118n may be closed by the predefined percentage (W %), as indicated at step 388. The predefined percentage (W) may be determined, for instance, through a trial and error process. By way of example, the openings of the vent tiles 118a-118n may be decreased by 10% and may be further decreased by 10% increments for subsequent iterations of step 388. If it is found that the 10% decrease does not change VTO, then the predefined percentage (W) may be decreased. The maximum levels to which the openings in the vent tiles 118a-118n are decreased may be limited to minimum levels of required airflow for the components 116 as set forth by, for instance, the component 116 manufacturers. Again, steps 378-388 may be repeated until it is determined that the $TMF_{VT}$ is within the predetermined percentage (X %) of the $TMF_R$.

Through implementation of the operational mode 300 and one or more of the optional operational modes 350, 360, and 370, the VTO may be determined, which may be used to determine the mass flow rate relationships between the racks 102a-102n and the vent tiles 118a-118n.

Figure 3E:
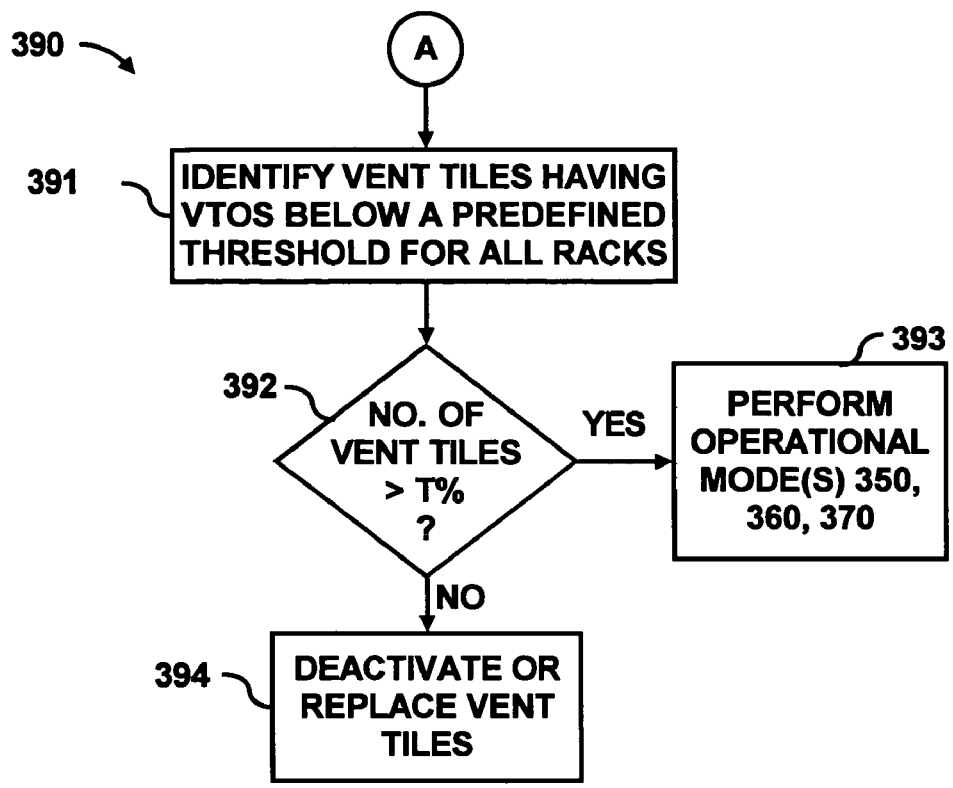
FIGS. 3E and 3F, illustrate alternative operational modes that may be employed with vent tiles that have little or no influence over any racks, according to embodiments of the invention.
Figure 3F:
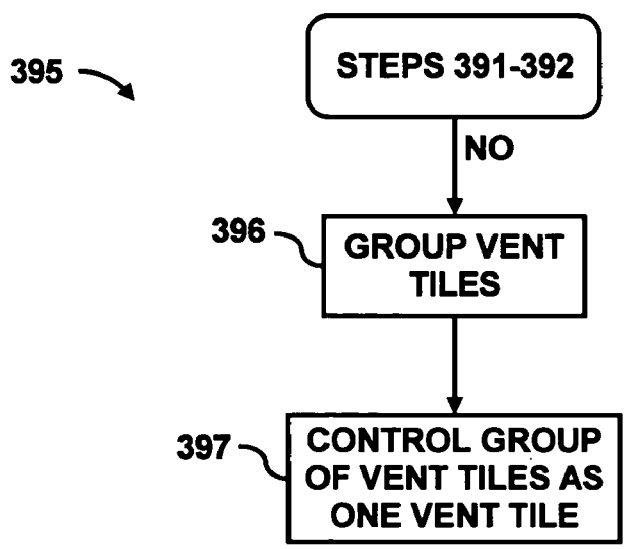

In addition, the VTO may be employed to identify vent tiles 118a-118n that may have relatively little or no influence over any of the racks 102a-102n. FIGS. 3E and 3F, illustrate alternative operational modes 390 and 395 that may be employed in situations where such vent tiles 118a-118n exist in a data center 100. In both of the operational modes 390 and 395, it is assumed that vent tiles 118a-118n that have relatively little or no influence over any of the racks 102a-102n have been detected based upon their calculated VTO values from the operational mode 300 (FIG. 3A).

With reference first to FIG. 3E and the operational mode 390, the vent tiles 118a-118n that have VTOs below a predefined threshold for all of the racks 102a-102n are identified at step 391. In other words, those vent tiles 118a-118n that have little or no influence over any of the racks 102a-102n may be determined and identified at step 391. The threshold may be determined based upon a plurality of factors. For instance, the threshold may be user-defined and may correlate to a desired percentage. By way of example, the threshold may be set at around 25%, such that, those vent tiles 118a-118n that have less than 25% influence over any particular rack 102a-102n may be identified at step 391.

At step 392, it may be determined whether the number of vent tiles 118a-118n identified at step 391 exceed a predetermined threshold (T %). Again, the predetermined threshold (T %) may be user-defined and may be based upon a desired percentage. Thus, for instance, if a certain percentage of all of the vent tiles 118a-118n, such as, 10-20% or more, is identified at step 391, then the steps outlined in one or more of the operational modes 350, 360, and 370 may be performed as indicated at step 393. In other words, the pre-commissioning steps outlined in any of those operational modes 350, 360, 370 may be performed to reduce the number of vent tiles 118a-118n that have little or no influence over any of the racks 102a-102n.

If it is determined at step 392 that the number of vent tiles 118a-118n identified at step 391 falls below or equals the predetermined threshold (T %), those identified vent tiles 118a-118n may be deactivated or replaced as indicated at step 394. At step 394, those identified vent tiles 118a-118n may be deactivated by closing them completely, removing power supply to those vent tiles 118a-118n, etc. Alternatively, those identified vent tiles 118a-118n may be replaced with standard vent tiles 118a-118n or tiles that do not have vents. In addition, those identified vent tiles 118a-118n may be installed in locations where vent tiles are known to have greater levels of influence over the racks 102a-102n. In this regard, the relatively more expensive vent tiles 118a-118n may be used more efficiently at locations where they may be of greater utility and the relatively less expensive tiles may be used in locations where vent tiles 118a-118n would not be of great use.

With reference now to FIG. 3F, following steps 391 and 392 in FIG. 3E, instead of performing step 394, the vent tiles 118a-118n identified at step 391 may be placed into one or more groups at step 396. The one or more groups may be formed according to the locations of the identified vent tiles 118a-118n. More particularly, vent tiles 118a-118n in close proximity to each other, for instance, adjacent vent tiles 118a-118n, may be placed in one group and other similarly situated vent tiles 118a-118n may be placed in another group. At step 397, each of the one or more groups formed of the vent tiles 118a-118n may be controlled as single vent tiles 118a-118n. In other words, a group of vent tiles 118a-118n may be controlled substantially simultaneously to influence airflow characteristics to particular racks 102a-102n.

Figure 4:
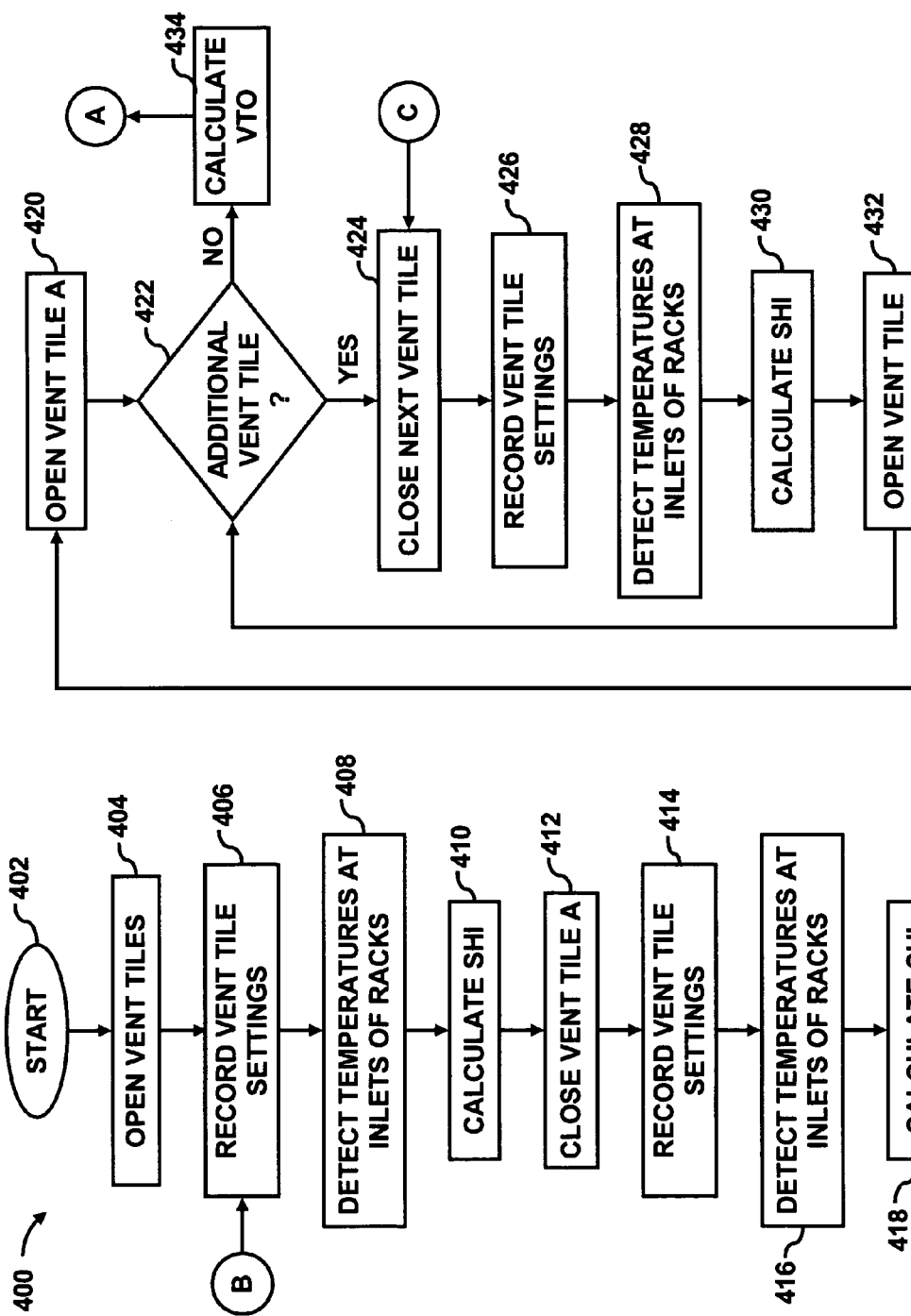
FIG. 4 illustrates a flow diagram of an operational mode for determining a vent tile opening index (VTO), according to another embodiment of the invention.

FIG. 4 illustrates a flow diagram of an operational mode 400 for determining a vent tile opening index (VTO), in which the effects of re-circulation are factored in determining the VTO. It is to be understood that the following description of the operational mode 400 is but one manner of a variety of different manners in which the VTO could be determined. It should also be apparent to those of ordinary skill in the art that the operational mode 400 represents a generalized illustration and that other steps may be added or existing steps may be removed or modified without departing from a scope of the operational mode 400. The description of the operational mode 400 is made with reference to the block diagram 200 illustrated in FIG. 2, and thus makes reference to the elements cited therein.

The operational mode 400 may be initiated in response to a variety of stimuli at step 402. For example, the operational mode 400 may be initiated in response to a predetermined lapse of time, in response to receipt of a transmitted signal, manually initiated, etc. At step 404, all of the vent tiles 118a-118n of a particular group of vent tiles 118a-118n may be opened in manners similar to those described herein above with respect to step 304 in FIG. 3A.

At step 406, the settings of the vent tiles 118a-118n may be recorded, for instance, in the memory 212. The settings may include the percentages to which the vent tiles 118a-118n are open, the speeds of the fans 154, etc. In any regard, at step 408, the temperatures at the inlets of the racks 102a-102n may be detected with the temperature sensors 208 at the recorded vent tile 118a-118n settings. The inlet temperatures may also be detected through any of the various other means described hereinabove. In any respect, the detected inlet temperatures may be transmitted or otherwise sent to the input/output module 206 and may also be stored in the memory 212.

At step 410, SHI may be calculated based upon temperatures detected at various locations in the data center 100. For instance, temperatures may be detected at the racks 102a-102n and the vent tiles 118a-118n and may be used to calculate SHI. In addition, the calculated SHI may be stored in the memory 212. As described in co-pending U.S. patent application Ser. No. 10/446,854, SHI may be determined through the following equation:

Equation (8):
$$SHI = \frac{\sum_j \sum_i ((T^r_{in})_{i,j} - T_{ref})}{\sum_j \sum_i ((T^r_{out})_{i,j} - T_{ref})},$$

where $(T^r_{in})_{i,j}$ and $(T^r_{out})_{i,j}$ are the respective inlet and outlet temperatures from the ith rack in the jth row of racks. In addition, $T_{ref}$ denotes the temperature of the cooled air supplied by one or more of the CRAC units 114 and may denote the average temperature of the airflow supplied through the vent tiles 118a-118n.

At step 412, one of the vent tiles 118a-118n, for instance, vent tile 118a, may be closed to substantially prevent the flow of air therethrough. Alternatively, the fan 154 of one of the vent tiles 118a-118n may be deactivated or otherwise turned off. The selection of which one of the vent tiles 118a-118n to close may be predetermined or it may be random. In any respect, the settings of the vent tiles 118a-118n may be recorded at step 414 and the temperatures at the inlets of the racks 102a-102n may be detected at step 416 at the recorded settings. In addition, the SHI may also be calculated and recorded at step 418.

The vent tile 118a that was closed at step 412 may be opened at step 420. This vent tile 118a may be opened to the percentage it was open at step 404. At step 422, it may be determined whether another vent tile 118a-118n is to be closed. In one example, the "yes" condition may be reached at step 422 until conditions for each of the vent tiles 118a-118n being in closed positions have been determined. In another example, the "yes" condition at step 422 may be reached for a predetermined number of vent tiles 118a-118n equaling less than all of the vent tiles 118a-118n. In any respect, the determination of whether to close another vent tile 118a-118n may be made by the controller 204.

If it is determined that another vent tile 118a-118n is to be closed, another vent tile 118a-118n, for instance, vent tile 118b, may be closed at step 424. Again, the selection of which one of the vent tiles 118a-118n to close may be predetermined or it may be random. In any respect, the settings of the vent tiles 118a-118n may be recorded at step 426 and the temperatures at the inlets of the racks 102a-102n may be detected at step 428 at the recorded settings. In addition, the SHI may also be calculated and recorded at step 430.

The vent tile 118b that was closed at step 424 may be opened at step 432. This vent tile 118b may also be opened to the percentage it was open at step 404.

Following step 432, it may be determined if another vent tile 118a-118n is to be closed at step 422. Steps 422-432 may be repeated for a predetermined number of times or until the conditions for each of the vent tiles 118a-118n being closed have been determined. In this case, which equates to a "no" condition at step 422, the controller 204 may calculate the VTO, as indicated at step 434. More particularly, the VTO calculation module 214 of the controller 204 may calculate the VTO based upon the information regarding the temperatures detected at the inlets of the racks 102a-102n and the SHI's with various vent tiles 118a-118n closed, at the various vent tile 118a-118n settings. That is, the rack 102a-102n inlet temperatures with various vent tiles 118a-118n being closed. In addition, the re-circulation temperature matrix $[RM_{temp}]$ may be calculated based upon the calculated SHI's for Equation (3) as described hereinabove. Moreover, the VTO calculation module 214 may calculate the VTO in matrix form according to Equation (3).

Although the operational mode 400 may end following calculation of the VTO at step 434, optional procedures may be implemented in various circumstances. The optional procedures may be implemented, for instance, in cases where the blowers of CRAC units 114 are over-provisioned, which may lead to an excessive amount of airflow being supplied from the vent tiles 118a-118n. In some instances, this excessive flow may cause the airflow to dramatically exceed the flow necessary for the racks 102a-102n. In these instances, evaluation of VTO may not be possible. To overcome this possibility, the optional procedures depicted in FIGS. 3B and 3C may be implemented as alternative optional procedures, as described in greater detail hereinabove.

In other instances, the mass flow rates of air supplied through the vent tiles 118a-118n may fall below or exceed the required mass flow rates of air required to safely operate the equipment housed in the racks 102a-102n. In these instances, an optional pre-commissioning procedure depicted in FIG. 3D may be implemented to substantially overcome these possibilities, as also described in greater detail hereinabove.

The operations illustrated in the operational modes 300, 350, 360, 370, 390, 395, and 400 may be contained as a utility, program, or a subprogram, in any desired computer accessible medium. In addition, the operational modes and 300, 350, 360, 370, 390, 395, and 400 may be embodied by a computer program, which can exist in a variety of forms both active and inactive. For example, they can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 5:
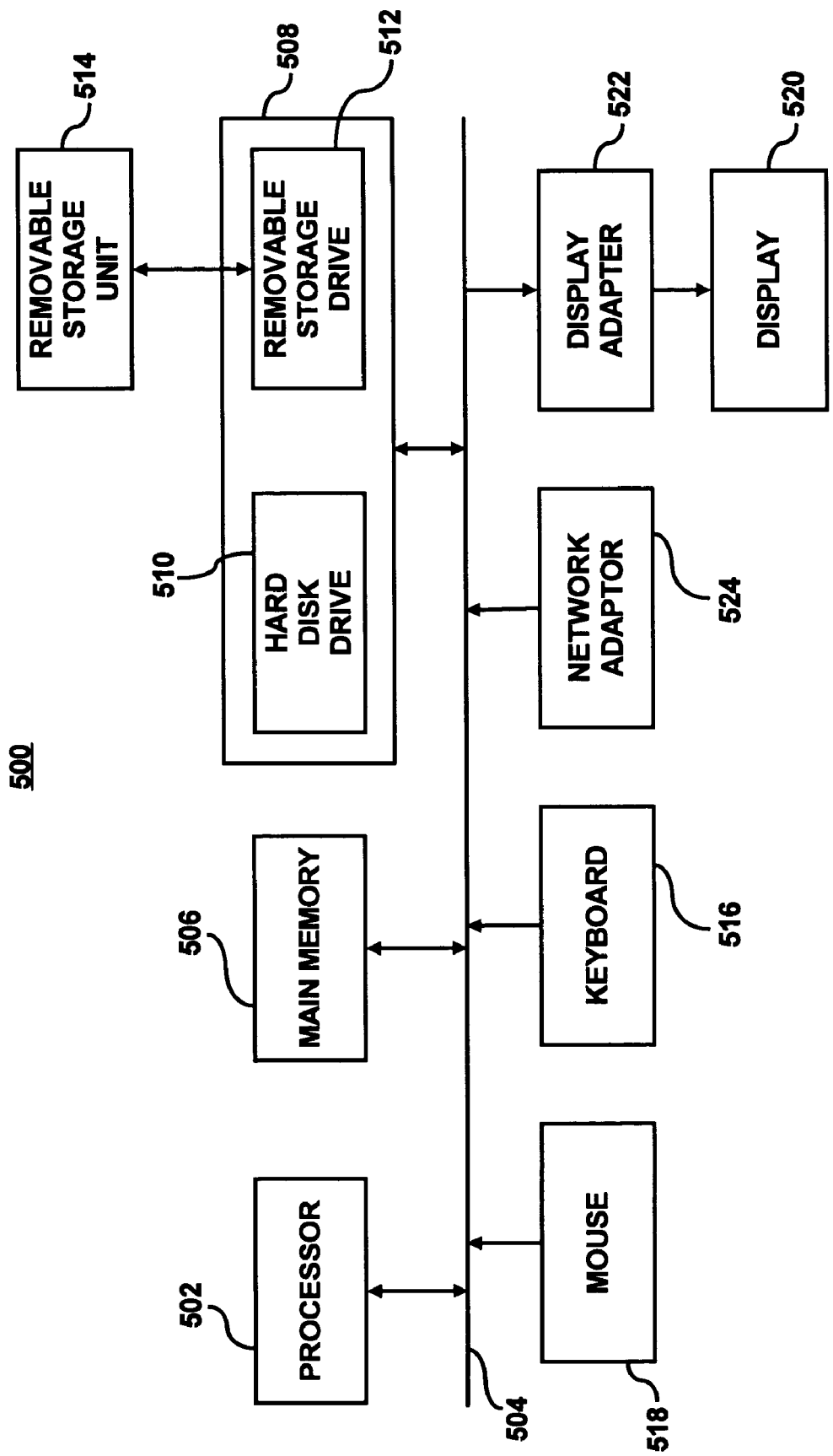
FIG. 5 illustrates a computer system, which may be employed to perform various functions described herein, according to an embodiment of the invention.

FIG. 5 illustrates a computer system 500, which may be employed to perform various functions described herein. The computer system 500 may include, for example, the computing device 128 and/or the controller 204. In this respect, the computer system 500 may be used as a platform for executing one or more of the functions described herein above with respect to the various components of the vent tile opening index evaluation system 202.

The computer system 500 includes one or more controllers, such as a processor 502. The processor 502 may be used to execute some or all of the steps described in the operational modes 300, 350, 360, 370, 390, 395, and 400. Commands and data from the processor 502 are communicated over a communication bus 504. The computer system 500 also includes a main memory 506, such as a random access memory (RAM), where the program code for, for instance, the computing device 128 or the controller 204, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the vent tile opening index evaluation system may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor 502 may communicate over a network, for instance, the Internet, LAN, etc., through a network adaptor 524.

It will be apparent to one of ordinary skill in the art that other known electronic components may be added or substituted in the computer system 500. In addition, the computer system 500 may include a system board or blade used in a rack in a data center, a conventional "white box" server or computing device, etc. Also, one or more of the components in FIG. 5 may be optional (e.g., user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for correlating vent tiles with racks based upon vent tile settings and rack inlet temperatures, said method comprising:
   (a) setting the vent tiles to a first setting;
   (b) recording the first vent tile settings;
   (c) detecting temperatures at inlets of the racks;
   (d) closing one of the vent tiles to obtain second vent tile settings;
   (e) repeating steps (b) and (c); and
   (f) correlating the vent tiles and the racks based upon the settings of the vent tiles and the temperatures detected at the first vent tile settings and the second vent tile settings.

2. The method according to claim 1, further comprising:
   (g) opening the closed vent tile;
   (h) setting another vent tile to a third setting; and
   (i) repeating steps (b), (c) and (f), wherein step (f) comprises correlating the vent tiles and the racks based upon the settings of the vent tiles and the temperatures detected at the first, second and third vent tile settings.

3. The method according to claim 2, wherein the step of setting the vent tiles to a first setting comprises opening the vent tiles, wherein the step of setting another vent tile to a third setting comprises closing the another vent tile.

4. The method according to claim 1, wherein the vent tiles comprise fan assemblies, wherein the step of setting the vent tiles to a first setting comprises activating the fan assemblies such that the fan assemblies cause airflow out of the vent tiles, and wherein the step of closing one of the vent tiles comprises deactivating one of the fan assemblies.

5. The method according to claim 1, wherein the step of correlating the vent tiles and the racks further comprises solving the following matrix equation:

$$[VTO]=[\Delta T_R]\cdot[\Delta TO]^{-1},$$

wherein VTO is a vent tile opening index matrix, $\Delta T_R$ is a matrix of inlet temperatures of air delivered to each rack, and $\Delta TO$ is a tile opening matrix of each vent tile.

6. The method according to claim 1, wherein the racks include inlets and outlets, said method further comprising:
   detecting temperatures at the inlets and outlets of the racks;
   detecting temperatures of the air supplied by the vent tiles;
   calculating an index of re-circulation based upon the detected temperatures; and
   factoring the calculated index of re-circulation in correlating the vent tiles and the racks.

7. The method according to claim 6, wherein the step of factoring the calculated index of re-circulation further comprises solving the following matrix equation:

$$[\Delta T_R]=[[VTO]\cdot[\Delta TO]]+[\Delta RM_{temp}],$$

wherein VTO is a vent tile opening index matrix, $\Delta T_R$ is a matrix of inlet temperatures of air delivered to each rack, $\Delta TO$ is a tile opening matrix of each vent tile, and $\Delta RM_{temp}$ is a re-circulation temperature matrix that accounts for the influence of re-circulation on the rack inlet temperatures.

8. The method according to claim 7, further comprising:
   solving for the re-circulation temperature matrix $RM_{temp}$ according to the following equation:

$$[\Delta RM_{temp}] = [\Delta(T_{out} - T_{in})] = \left[\Delta\left\{(T_{in} - T_{ref}) * \frac{(1 - SHI)}{SHI}\right\}\right],$$

the $\Delta T_{in}$ is equivalent to the $\Delta T_R$, $\Delta T_{out}$ is the change in temperature at the outlet of a rack, $\Delta T_{ref}$ is equivalent to the temperature of the airflow supplied through the vent tiles 118a-118n, and SHI is an index of air re-circulation.

9. The method according to claim 8, wherein SHI is determined through the following equation:

$$SHI = \frac{\sum_j \sum_i \left((T^r_{in})_{i,j} - T_{ref}\right)}{\sum_j \sum_i \left((T^r_{out})_{i,j} - T_{ref}\right)},$$

where $(T^r_{in})_{i,j}$ and $(T^r_{out})_{i,j}$ are the respective inlet and outlet temperatures from the ith rack in the jth row of racks, and $T_{ref}$ denotes the average temperature of the air supplied through the vent tiles.

10. The method according to claim 1, wherein the step of correlating the vent tiles and the racks further comprises calculating a vent tile opening index (VTO) having values, said method further comprising:
   determining whether the values of the calculated VTO are near zero;
   reducing the vent tile openings by a predefined amount in response to the values of the calculated VTO being near zero; and
   repeating steps (b)-(f).

11. The method according to claim 1, wherein the step of correlating the vent tiles and the racks further comprises calculating a vent tile opening index (VTO) having values, and wherein the airflow supplied through the vent tiles is supplied by a computer room air conditioning unit (CRAC) unit, said method further comprising:
 determining whether the values of the calculated VTO are near zero;
 reducing output of the CRAC unit by a predefined amount in response to the values of the calculated VTO being near zero; and
 repeating steps (b)-(f).

12. The method according to claim 1, wherein the racks house equipment, said method further comprising:
 determining total airflow requirements of the equipment housed in the racks;
 opening the vent tiles to a uniform level;
 determining mass flow rates of air supplied through the vent tiles;
 summing the mass flow rates of air supplied through the vent tiles;
 determining whether the summed mass flow rates of air supplied through the vent tiles falls within a predetermined percentage of the total airflow requirements of the equipment housed in the racks; and
 performing step (a) with the vent tiles set to the uniform level in response to the summed mass flow rates of air supplied through the vent tiles falling within the predetermined percentage of the total airflow requirements of the equipment housed in the racks.

13. The method according to claim 12, further comprising:
 increasing the vent tile openings by a predefined amount in response to the summed mass flow rates of air supplied through the vent tiles falling below or equaling the predetermined percentage of the total airflow requirements of the equipment housed in the racks;
 determining mass flow rates of air supplied through the vent tiles at the increased vent tile openings;
 summing the mass flow rates of air supplied through the vent tiles;
 determining whether the summed mass flow rates of air supplied through the vent tiles falls within a predetermined percentage of the total airflow requirements of the equipment housed in the racks; and
 performing step (a) with the vent tiles set at the increased openings in response to the summed mass flow rates of air supplied through the vent tiles falling within the predetermined percentage of the total airflow requirements of the equipment housed in the racks.

14. The method according to claim 12, further comprising:
 decreasing the vent tile openings by a predefined amount in response to the summed mass flow rates of air supplied through the vent tiles exceeding the predetermined percentage of the total airflow requirements of the equipment housed in the racks.
 determining mass flow rates of air supplied through the vent tiles at the decreased vent tile openings;
 summing the mass flow rates of air supplied through the vent tiles;
 determining whether the summed mass flow rates of air supplied through the vent tiles falls within a predetermined percentage of the total airflow requirements of the equipment housed in the racks; and
 performing step (a) with the vent tiles set at the decreased openings in response to the summed mass flow rates of air supplied through the vent tiles falling within the predetermined percentage of the total airflow requirements of the equipment housed in the racks.

15. The method according to claim 1, wherein the step of correlating the vent tiles and the racks further comprises approximating a correlation between at least one of the vent tiles and at least one of the racks based upon a distance between the at least one of the vent tiles and the at least one of the racks.

16. The method according to claim 1, further comprising:
 identifying vent tiles whose influence over the racks is below a predefined threshold;
 determining whether the number of identified vent tiles exceeds a predetermined threshold; and
 at least one of deactivating and replacing the identified vent tiles in response to the number of identified vent tiles falling below the predetermined threshold.

17. The method according to claim 1, further comprising:
 identifying vent tiles whose influence over the racks is below a predefined threshold;
 determining whether the number of identified vent tiles exceeds a predetermined threshold; and
 grouping the identified vent tiles into one or more groups according to their locations with respect to each other in response to the number of identified vent tiles falling below the predetermined threshold.

18. A computing device configured to evaluate relationships between vent tiles and racks, said computing device comprising:
 a vent tile opening index (VTO) calculation module, wherein the VTO calculation module is configured to determine a correlation between the vent tiles and the rack, said VTO calculation module being further configured to store the correlation.

19. The computing device according to claim 18, wherein the VTO calculation module is further configured to solve the following matrix equation:

$$[VTO] = [\Delta T_R] \cdot [\Delta TO]^{-1},$$

wherein VTO is a vent tile opening index matrix, $\Delta T_R$ is a matrix of inlet temperatures of air delivered to each rack, and $\Delta TO$ is a tile opening matrix of each vent tile.

20. The computing device according to claim 18, further comprising:
 an index of re-circulation module configured to calculate levels of re-circulation of heated airflow into cooled airflow delivered into the racks from the vent tiles.

21. The computing device according to claim 20, wherein the VTO calculation module is further configured to solve the following matrix equation:

$$[\Delta T_R] = [[VTO] \cdot [\Delta TO]] + [\Delta RM_{temp}],$$

wherein VTO is a vent tile opening index matrix, $\Delta T_R$ is a matrix of inlet temperatures of air delivered to each rack, $\Delta TO$ is a tile opening matrix of each vent tile, and $\Delta RM_{temp}$ is a re-circulation temperature matrix that accounts for the influence of re-circulation on the rack inlet temperatures.

22. The computing device according to claim 21, wherein the VTO calculation module is further configured to solve for the re-circulation temperature matrix $\Delta RM_{temp}$ according to the following equation:

$$[\Delta RM_{temp}] = [\Delta(T_{out} - T_{in})] = \left[\Delta\left\{(T_{in} - T_{ref}) * \frac{(1 - SHI)}{SHI}\right\}\right],$$

the $\Delta T_{in}$ is equivalent to the $\Delta T_R$, $\Delta T_{out}$ is the change in temperature at the outlet of a rack, $\Delta T_{ref}$ is equivalent to the temperature of the airflow supplied through the vent tiles, and SHI is an index of air re-circulation.

23. The computing device according to claim 22, wherein SHI is determined through the following equation:

$$SHI = \frac{\sum_j \sum_i ((T^r_{in})_{i,j} - T_{ref})}{\sum_j \sum_i ((T^r_{out})_{i,j} - T_{ref})},$$

where $(T^r_{in})_{i,j}$ and $(T^r_{out})_{i,j}$ are the respective inlet and outlet temperatures from the ith rack in the jth row of racks, and $T_{ref}$ denotes the average temperature of the air supplied through the vent tiles.

24. The computing device according to claim 18, further comprising:
a controller configured to control one or more functions of the computing device, wherein said controller is configured to determine whether values of the calculated VTO are near zero, and wherein the controller is further configured vary at least one of vent tile openings and CRAC unit outputs based upon a determination that values of the calculated VTO are near zero.

25. The computing device according to claim 18, further comprising:
a controller configured to control one or more functions of the computing device, wherein said controller is configured to determine a total airflow requirement of equipment housed in the racks, determine the mass flow rates of air supplied through the vent tiles, sum the mass flow rates of air supplied through the vent tiles, determine whether the summed mass flow rates of air supplied through the vent tiles falls within a predetermined percentage of the total airflow requirements of the equipment, and vary the vent tile openings by a predefined amount in response to the summed mass flow rates of air supplied through the vent tiles falling outside the predetermined percentage of the total airflow requirements of the equipment.

26. The computing device according to claim 18, further comprising:
a controller configured to group vent tiles that have relatively little influence over the racks into one or more groups, and wherein the controller is configured to control each of the one or more groups of vent tiles as individual vent tiles.

27. A system for evaluating relationships between vent tiles and racks, said system comprising:
means for varying vent tile settings;
means for recording the vent tile settings;
means for detecting temperatures at inlets of the racks at different vent tile settings; and
means for calculating a vent tile opening index, said vent tile opening index correlating a relationship between the vent tiles and the racks.

28. The system according to claim 27, wherein the racks have inlets and outlets, said method further comprising:
means for detecting temperatures at one or both of the inlets and the outlets of the racks;
means for detecting temperatures of airflow supplied through the vent tiles; and
wherein the means for calculating the vent tile opening index is configured to consider the temperatures detected by the means for detecting temperatures at one or both of the inlets and the outlets of the racks and the means for detecting temperatures of airflow supplied through the vent tiles.

29. The system according to claim 28, further comprising:
means for calculating an index of re-circulation; and
wherein the means for calculating the vent tile opening index is configured to consider the index of re-circulation calculated by the means for calculating.

30. A computer readable storage medium on which is embedded one or more computer programs, said one or more computer programs implementing a method of correlating vent tiles with racks based upon vent tile settings and rack inlet temperatures, said one or more computer programs comprising a set of instructions for:
(a) setting the vent tiles to a first setting;
(b) recording the first vent tile settings;
(c) detecting temperatures at inlets of the racks;
(d) closing one of the vent tiles to obtain a second settings;
(e) repeating steps (b) and (c);
(f) correlating the vent tiles and the racks based upon the settings of the vent tiles and the temperatures detected at the first setting and the second setting;
(g) opening the closed vent tile;
(h) setting another vent tile to a third setting; and
(i) repeating steps (b), (c) and (f), wherein step (f) comprises correlating the vent tiles and the racks based upon the settings of the vent tiles and the temperatures detected at the first, second and third settings.

31. The computer readable storage medium according to claim 30, said one or more computer programs further comprising a set of instructions for:
solving the following matrix equation:

$[VTO]=[\Delta T_R]\cdot[\Delta TO]^{-1}$, wherein VTO is a vent tile opening index matrix, $\Delta T_R$ is a matrix of inlet temperatures of air delivered to each rack, and $\Delta TO$ is a tile opening matrix of each vent tile.

32. The computer readable storage medium according to claim 30, said one or more computer programs further comprising a set of instructions for:
solving the following matrix equation:

$[\Delta T_R]=[[VTO]\cdot[\Delta TO]]+[\Delta RM_{temp}]$, wherein VTO is a vent tile opening index matrix, $\Delta T_R$ is a matrix of inlet temperatures of air delivered to each rack, $\Delta TO$ is a tile opening matrix of each vent tile, and $\Delta RM_{temp}$ is a re-circulation temperature matrix that accounts for the influence of re-circulation on the rack inlet temperatures.

* * * * *

UNITED STATES PATENT AND TRADEMARK OFFICE
CERTIFICATE OF CORRECTION

| | | |
|---|---|---|
| PATENT NO. | : 7,251,547 B2 | Page 1 of 1 |
| APPLICATION NO. | : 10/960574 | |
| DATED | : July 31, 2007 | |
| INVENTOR(S) | : Cullen E. Bash et al. | |

It is certified that error appears in the above-identified patent and that said Letters Patent is hereby corrected as shown below:

In column 22, line 16, in Claim 6, after "temperature of" delete "the".

In column 22, line 33, in Claim 8, delete "$RM_{temp}$" and insert -- $\Delta RM_{temp}$ --, therefor.

In column 22, line 43, in Claim 8, delete "118a-118n".

In column 23, line 4, in Claim 11, after "wherein" delete "the".

In column 23, line 57, in Claim 14, delete "racks." and insert -- racks, --, therefor.

In column 24, line 33, in Claim 18, delete "rack" and insert -- racks --, therefor.

In column 25, line 23, in Claim 24, after "whether" insert -- calculated --.

In column 25, line 33, in Claim 25, after "determine" delete "the".

In column 26, line 27, in Claim 30, delete "obtain a second settings" and insert -- obtain second vent tile settings --, therefor.

In column 26, line 33, in Claim 30, delete "tile to a third setting" and insert -- tile to obtain third vent tile settings --, therefor.

Signed and Sealed this

Fourteenth Day of July, 2009

JOHN DOLL
*Acting Director of the United States Patent and Trademark Office*